(12) United States Patent
Sun et al.

(10) Patent No.: US 10,599,899 B2
(45) Date of Patent: Mar. 24, 2020

(54) OUTPUT SYSTEM AND IMAGE FORMING APPARATUS

(71) Applicant: KYOCERA Document Solutions Inc., Osaka (JP)

(72) Inventors: Zhenyu Sun, Osaka (JP); Yumi Nakagoshi, Osaka (JP); Tatsuya Hiwatari, Osaka (JP); Yoshio Inoue, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 278 days.

(21) Appl. No.: 15/705,962

(22) Filed: Sep. 15, 2017

(65) Prior Publication Data
US 2018/0082097 A1     Mar. 22, 2018

(30) Foreign Application Priority Data

Sep. 16, 2016 (JP) ................................ 2016-181485
Sep. 16, 2016 (JP) ................................ 2016-181486
Sep. 16, 2016 (JP) ................................ 2016-181488
Sep. 16, 2016 (JP) ................................ 2016-181490

(51) Int. Cl.
*G06K 7/14* (2006.01)
*G06K 19/06* (2006.01)
*H04N 1/32* (2006.01)
*H04N 1/34* (2006.01)

(52) U.S. Cl.
CPC ..... *G06K 7/1417* (2013.01); *G06K 19/06037* (2013.01); *H04N 1/32122* (2013.01); *H04N 1/344* (2013.01); *H04N 1/346* (2013.01); *H04N 2201/0094* (2013.01); *H04N 2201/3222* (2013.01); *H04N 2201/3246* (2013.01)

(58) Field of Classification Search
CPC .......... G06K 7/1417; G06K 19/06037; H04N 1/32122; H04N 1/344; H04N 1/346; H04N 2201/3246; H04N 2201/0094; H04N 2201/3222
See application file for complete search history.

(56) References Cited

U.S. PATENT DOCUMENTS

| 8,189,220 | B2 * | 5/2012 | Subramanian | ......... G06Q 30/06 |
| | | | | 358/1.13 |
| 9,443,234 | B2 * | 9/2016 | Masui | ................... G06Q 20/145 |
| 9,501,769 | B2 * | 11/2016 | Guerin | ................. G06Q 20/202 |
| 9,706,331 | B2 * | 7/2017 | Banno | .................... H04W 4/00 |

(Continued)

FOREIGN PATENT DOCUMENTS

JP      2001-351167 A      12/2001

*Primary Examiner* — Seung H Lee
(74) *Attorney, Agent, or Firm* — Studebaker & Brackett PC

(57) ABSTRACT

An output system includes an output section, a fee calculation section, and a payment code notification section. The output section outputs an image and/or a document. The fee calculation section calculates a fee necessary for outputting the image and/or the document in accordance with a specific standard. The payment code notification section notifies a payment code issued by an online payment service for the fee calculated by the fee calculation section. The output section outputs the image and/or the document when the fee has been paid via the online payment service using the payment code notified by the payment code notification section.

15 Claims, 33 Drawing Sheets

(56) References Cited

U.S. PATENT DOCUMENTS

2005/0209960 A1\* 9/2005 Horihata ............... G06Q 20/10
705/39
2015/0124278 A1\* 5/2015 Juchem ................ G06Q 20/40
358/1.14

\* cited by examiner

38c Image management information

| Image ID | Job ID |
|----------|--------|
| IM001 | JB001 |
| IM002 | JB002 |
| ⋮ | ⋮ |

FIG. 4

42b MFP management information

| MFPID | Administrator ID |
|---|---|
| MF001 | MG001 |
| MF002 | MG002 |
| ⋮ | ⋮ |

42c Payment code management information

| Payment code | MFPID | Job ID |
|---|---|---|
| CD001 | MF001 | JB001 |
| CD002 | MF002 | JB002 |
| ⋮ | ⋮ | ⋮ |

FIG. 7

50c Payment code management information

| Payment code | Administrator ID | Fee | Computer ID |
|---|---|---|---|
| CD001 | MG001 | ¥100 | CM001 |
| CD002 | MG002 | ¥250 | CM002 |
| ⋮ | ⋮ | ⋮ | ⋮ |

FIG. 9

42d Payment code management information

| Payment code | MFPID | Print data ID |
|---|---|---|
| CD001 | MF001 | DT001 |
| CD002 | MF002 | DT002 |
| ⋮ | ⋮ | ⋮ |

FIG. 17

42h Image management information

| Image ID | Job ID | Transmission condition |
|---|---|---|
| IM001 | JB001 | SMB Destination○○○ |
| IM002 | JB002 | FTP Destination×× × |
| ⋮ | ⋮ | ⋮ |

FIG. 30

OUTPUT SYSTEM AND IMAGE FORMING APPARATUS

INCORPORATION BY REFERENCE

The present application claims priority under 35 U.S.C. § 119 to Japanese Patent Application No. 2016-181485, filed on Sep. 16, 2016, Japanese Patent Application No. 2016-181486, filed on Sep. 16, 2016, Japanese Patent Application No. 2016-181488, filed on Sep. 16, 2016, and Japanese Patent Application No. 2016-181490, filed on Sep. 16, 2016. The contents of these applications are incorporated herein by reference in their entirety.

BACKGROUND

The present disclosure relates to an output system that outputs an image and/or a document, and an image forming apparatus.

There has been widely known a system including a copier and a coin vending machine that enables payment of a fee in cash. In this system, payment of the fee is executed through the coin vending machine in real time upon execution of a copying job by the copier.

SUMMARY

An output system according to an aspect of the present disclosure includes an output section, a fee calculation section, and a payment code notification section. The output section outputs an image and/or a document. The fee calculation section calculates a fee necessary for outputting the image and/or the document in accordance with a specific standard. The payment code notification section notifies a payment code issued by an online payment service for the fee calculated by the fee calculation section. The output section outputs the image and/or the document when the fee has been paid via the online payment service using the payment code notified by the payment code notification section.

An image forming apparatus according to another aspect of the present disclosure includes an output section and a payment code notification section. The output section outputs an image and/or a document. The payment code notification section notifies a payment code issued by an online payment service for a fee calculated in accordance with a specific standard. The fee is necessary for outputting the image and/or the document. The output section outputs the image and/or the document when the fee has been paid via the online payment service using the payment code notified by the payment code notification section.

BRIEF DESCRIPTION OF THE DRAWINGS

FIG. 4 is a diagram illustrating an example of image management information according to the first embodiment.

FIG. 7 is a diagram illustrating an example of payment code management information according to the first and fourth embodiments.

FIG. 9 is a diagram illustrating an example of payment code management information according to the first through fourth embodiments.

FIG. 17 is a diagram illustrating an example of payment code management information according to the second and third embodiments.

FIG. 30 is a diagram illustrating an example of image management information according to the fourth embodiment.

DETAILED DESCRIPTION

Figure 1:
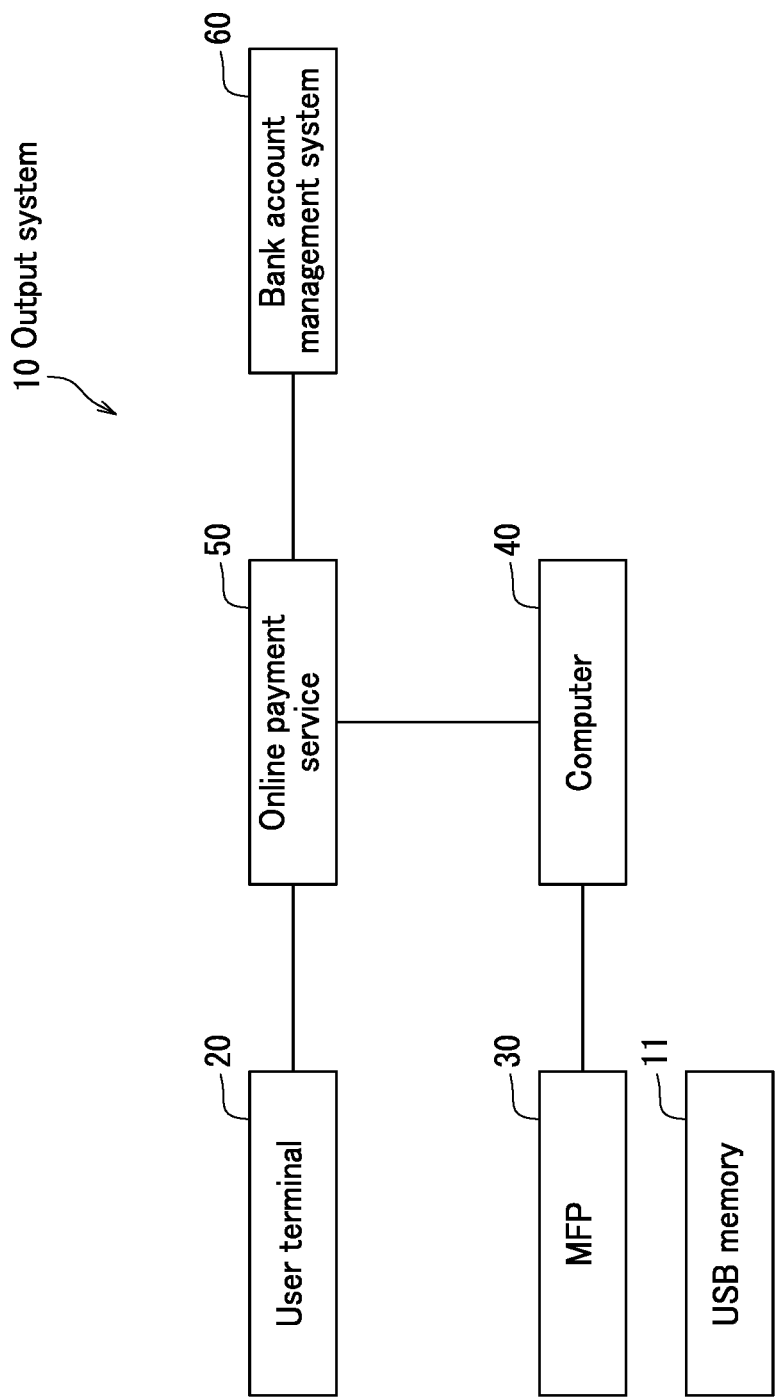
FIG. 1 is a block diagram of an output system according to a first embodiment and a second embodiment.

The following describes embodiments of the present disclosure with reference to the drawings. Note that in the drawings, elements that are the same or substantially equivalent are labelled using the same reference signs and explanation thereof will not be repeated.

First Embodiment

The following describes an output system (scan-external-storage system) 10 according to a first embodiment of the present disclosure.

FIG. 1 is a block diagram of the output system 10 according to the first embodiment.

Figure 3:
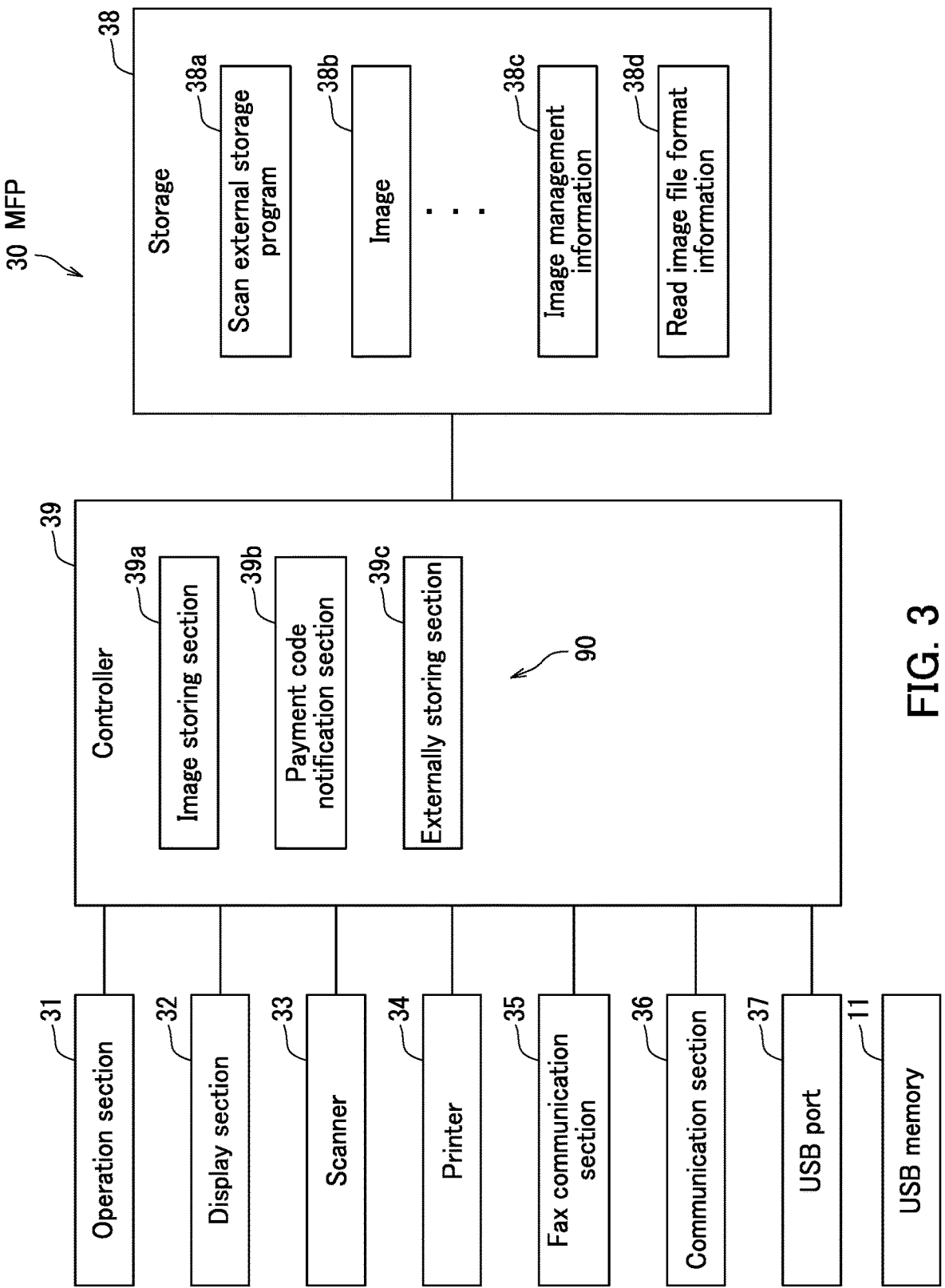
FIG. 3 is a block diagram of an MFP according to the first embodiment.

As illustrated in FIG. 1, the output system 10 according to the first embodiment includes a user terminal 20, a multi-function peripheral (MFP) 30 as an image forming apparatus, a computer 40, an online payment service 50, a bank account management system 60, and an output section 90 (see FIG. 3). The user terminal 20 is used by a user. The online payment service 50 executes online payment. The bank account management system 60 manages bank accounts.

The MFP 30 is installed for example in a commercial facility such as a convenience store or in a public facility such as a university. The output section 90 outputs an image and/or a document in response to payment of a fee by the user. Outputting an image and/or a document refers to for example at least one of: storing the image and/or the document in an external storage medium; printing the image and/or the document on a recording medium; and transmitting the image and/or the document.

The external storage medium refers to for example a storage medium that is not included in the MFP 30. The external storage medium in the first embodiment is a USB memory 11 that is attachable to and detachable from the MFP 30. In the first embodiment, an image is stored in (output to) the USB memory 11 by the MFP 30 in response to payment of the fee by the user. Further, transmitting the image and/or the document refers to for example transmitting the image and/or the document to a terminal designated by the user of the output system 10 by wire communication or wireless communication. Specifically, transmitting the image and/or the document refers to for example transmitting information indicating the image and/or the document to the terminal designated by the user of the output system 10 by wire communication or wireless communication. The output section 90 in the first embodiment includes an externally storing section 39c.

The computer 40 may be capable of executing processes regarding fees of at least one MFP that is similar to the MFP 30, as well as processes regarding fees of the MFP 30.

The online payment service 50 and the bank account management system 60 are each a cloud service. The online payment service 50 and the bank account management system 60 are each for example a system implemented by a server such as a cloud server.

The user terminal 20 and the online payment service 50 are capable of communicating with each other via a network such as the Internet.

The MFP 30 and the computer 40 are capable of communicating with each other via a network such as a local area network (LAN) or the Internet. Alternatively, the MFP 30 and the computer 40 are capable of communicating with each other by wire communication or wireless communication directly not via a network.

The computer 40 and the online payment service 50 are capable of communicating with each other via a network such as the Internet.

The online payment service 50 and the bank account management system 60 are capable of communicating with each other via a network such as the Internet.

Figure 2:
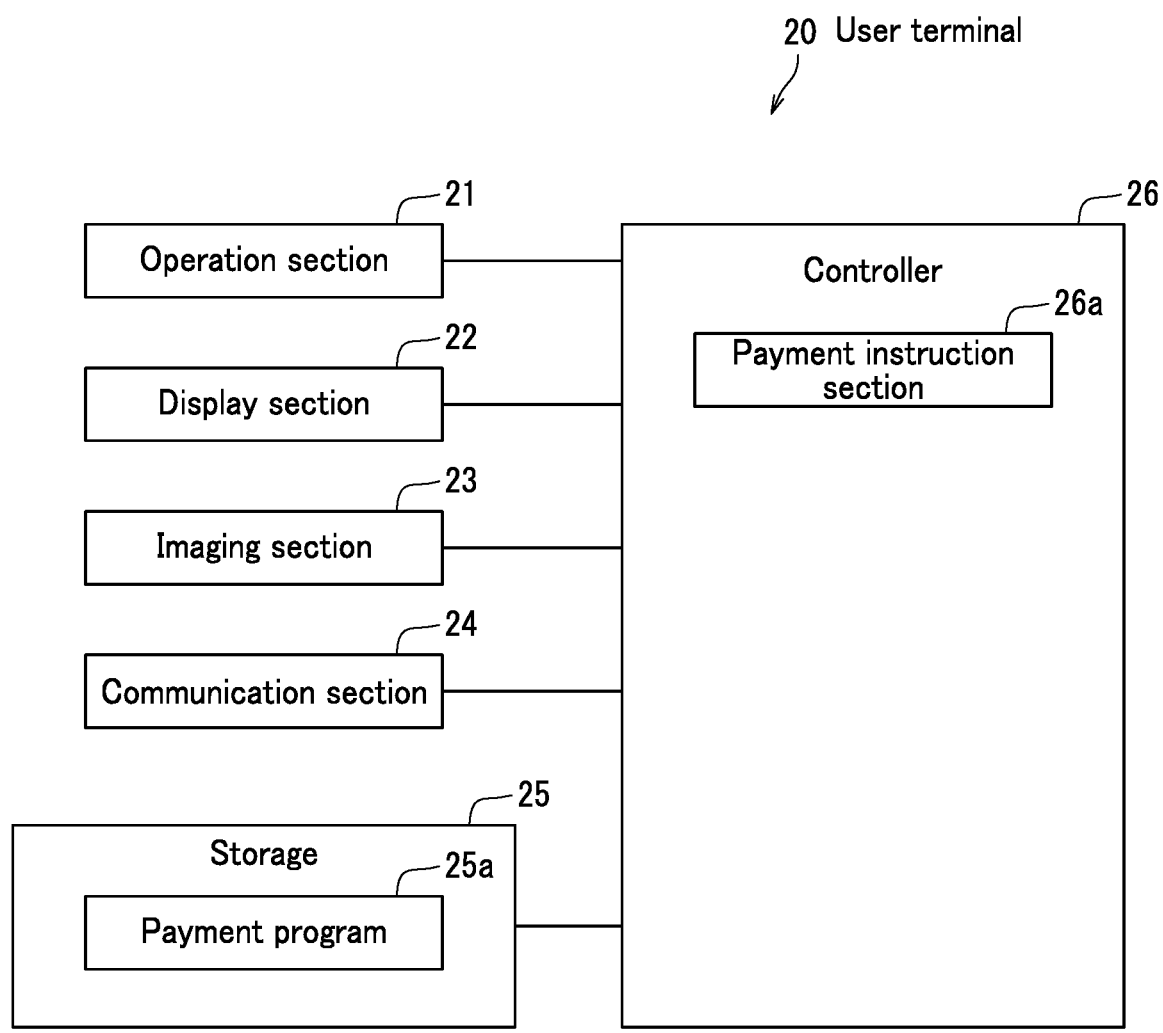
FIG. 2 is a block diagram of a user terminal according to the first through fourth embodiments.

FIG. 2 is a block diagram of the user terminal 20.

As illustrated in FIG. 2, the user terminal 20 includes an operation section 21, a display section 22, an imaging section 23, a communication section 24, a storage 25, and a controller 26. The user terminal 20 may be a mobile terminal such as for example a smartphone or a tablet terminal. The operation section 21 is an input device such as a button. Various operations are input through the operation section 21. The operation section 21 receives an instruction to cause the output section 90 to output an image and/or a document. The display section 22 is a display device such as a liquid crystal display (LCD) and displays various information. The imaging section 23 is an imaging device such as a camera. The communication section 24 is a communication device that communicates with an external device via a network. Note that the communication section 24 may communicate with the external device by wire communication or wireless communication directly not via a network. The storage 25 is a nonvolatile storage device such as a semiconductor memory. The storage 25 stores therein various information. The controller 26 controls each element of the user terminal 20. The controller 26 includes a payment instruction section 26a.

The storage 25 includes a main storage device (for example, a semiconductor memory) such as a read only memory (ROM) device or a random access memory (RAM) device, and may further include an auxiliary storage device (for example, a hard disk drive). The main storage device stores therein various computer programs executed by the controller 26. The storage 25 stores therein a payment program 25a for payment via the online payment service 50 (see FIG. 1). The payment program 25a may be installed in the user terminal 20 during manufacture of the user terminal 20. Alternatively, the payment program 25a may be additionally installed in the user terminal 20 from an external storage medium such as a universal serial bus (USB) memory. Alternatively, the payment program 25a may be additionally installed in the user terminal 20 via a network.

The controller 26 includes for example a processor such as a central processing unit (CPU) or a micro processing unit (MPU), a ROM device storing therein programs and various data, and a RAM device that is used as a work area of the CPU. The processor of the controller 26 executes the programs stored in the ROM device of the controller 26 or in the storage 25. Through execution of the computer programs stored in the ROM device of the controller 26 or in the storage 25, the processor of the controller 26 controls the operation section 21, the display section 22, the imaging section 23, the communication section 24, and the storage 25.

Through execution of the computer programs (specifically, the payment program 25a) stored in the ROM device of the controller 26 or in the storage 25, the processor of the controller 26 functions as the payment instruction section 26a.

FIG. 3 is a block diagram of the MFP 30.

As illustrated in FIG. 3, the MFP 30 includes an operation section 31, a display section 32, a scanner 33, a printer 34, a fax communication section 35, a communication section 36, a USB port 37, a storage 38, and a controller 39. The operation section 31 is an input device such as a button. Various operations are input through the operation section 31. The display section 32 is a display device such as an LCD and displays various information. The scanner 33 is a reading device that reads an image from a document. The printer 34 is a printing device that prints an image on a recording medium such as paper. The fax communication section 35 is a fax device that performs fax communication with an external fax device not illustrated via a communication line such as a public telephone line. The communication section 36 is a communication device that communicates with an external device via a network. Note that the communication section 36 may communicate with the external device by wire communication or wireless communication directly not via a network. The USB port 37 includes a connection section to which the USB memory 11 is connectable. The USB memory 11 is an external storage medium. That is, the USB memory 11 is not included in the MFP 30 and is attachable to and detachable from the MFP 30 via the USB port 37. The storage 38 is a nonvolatile storage device such as a semiconductor memory or a hard disk drive (HDD). The storage 38 stores therein various information. The controller 39 controls each element of the MFP 30.

The scanner 33 includes an auto document feeder (ADF) that is capable of automatically reading plural sheets of a document and a duplex-printed document. The scanner 33 reads an image from a document.

The storage 38 includes a main storage device such as a ROM device or a RAM device, and may further include an auxiliary storage device. The main storage device stores therein various computer programs executed by the controller 39. The storage 38 stores therein a scan-external-storage program 38a. The scan-external-storage program 38a is a program for executing a specific job. The specific job is a job of storing an image 38b read from a document by the scanner 33 in an external storage medium. The scan-external-storage program 38a may be installed in the MFP 30 during manufacture of the MFP 30. Alternatively, the scan-external-storage program 38a may be additionally installed in the MFP 30 from an external storage medium such as a USB memory. Alternatively, the scan-external-storage program 38a may be additionally installed in the MFP 30 via a network.

The storage 38 is capable of storing therein plural images 38b read from documents by the scanner 33.

The storage 38 is capable of storing therein image management information 38c for managing the images 38b.

FIG. 4 is a diagram illustrating an example of the image management information 38c.

As illustrated in FIG. 4, the image management information 38c is information in which an image ID that is identification information of an image 38b (see FIG. 3) is associated with a job ID that is identification information of a job.

As illustrated in FIG. 3, the storage 38 is capable of storing therein read image file format information 38d. The read image file format information 38d indicates a file format of an image read from a document by the scanner 33. Examples of file formats of an image read from a document by the scanner 33 include a portable document format (PDF), a tagged image file format (TIFF), and a joint photographic experts group (JPEG). The file format of an image read from a document by the scanner 33 can be specified for example through the operation section 31.

The controller 39 includes for example a processor such as a CPU or an MPU, a ROM device storing therein programs and various data, and a RAM device that is used as a work area of the CPU. The processor of the controller 39 executes the programs stored in the ROM device of the controller 39 or in the storage 38. Through execution of the computer programs stored in the ROM device of the controller 39 or in the storage 38, the processor of the controller 39 controls the operation section 31, the display section 32, the scanner 33, the printer 34, the fax communication section 35, the communication section 36, the USB port 37, and the storage 38.

Through execution of the computer programs (specifically, the scan-external-storage program 38a) stored in the ROM device of the controller 39 or in the storage 38, the processor of the controller 39 functions as an image storing section 39a, a payment code notification section 39b, and the externally storing section 39c. The image storing section 39a stores in the storage 38 an image 38b read from a document by the scanner 33. The payment code notification section 39b notifies a payment code issued by the online payment service 50 (see FIG. 1) for a fee calculated by the computer 40 (see FIG. 1). When the fee is paid via the online payment service 50 using the payment code notified by the payment code notification section 39b, the externally storing section 39c stores in the USB memory 11 as the external storage medium the image 38b stored in the storage 38.

Figure 5:
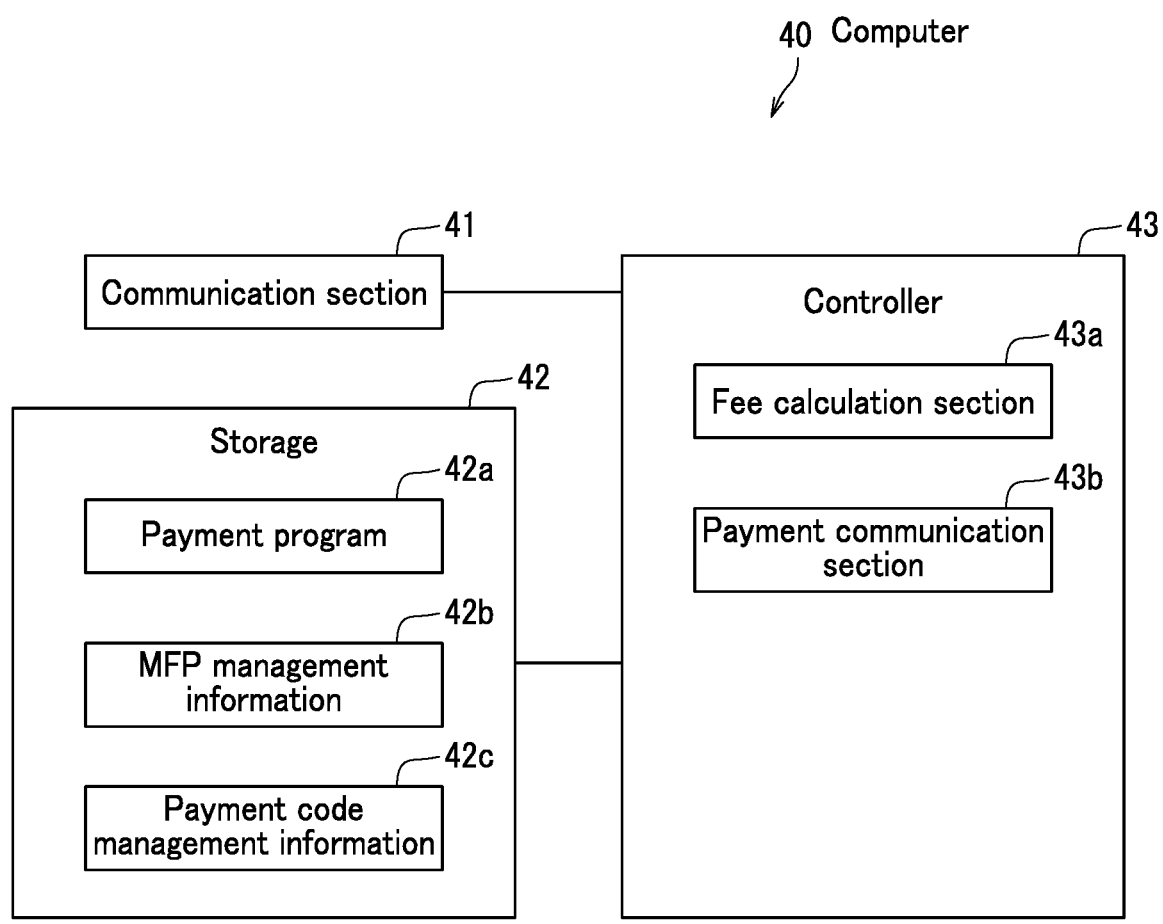
FIG. 5 is a block diagram of a computer according to the first embodiment.

FIG. 5 is a block diagram of the computer 40.

As illustrated in FIG. 5, the computer 40 includes a communication section 41, a storage 42, and a controller 43. The communication section 41 is a communication device that communicates with an external device via a network. Note that the communication section 41 may communicate with the external device by wire communication or wireless communication directly not via a network. The storage 42 includes a main storage device such as a ROM device or a RAM device, and may further include an auxiliary storage device. The main storage device stores therein various computer programs executed by the controller 43. The storage 42 is a nonvolatile storage device such as a semiconductor memory. The storage 42 stores therein various information. The controller 43 controls each element of the computer 40.

The storage 42 stores therein a payment program 42a for payment via the online payment service 50 (see FIG. 1). The payment program 42a may be installed in the computer 40 during manufacture of the computer 40. Alternatively, the payment program 42a may be additionally installed in the computer 40 from an external storage medium such as a USB memory, a compact disk (CD), or a digital versatile disk (DVD). Alternatively, the payment program 42a may be additionally installed in the computer 40 via a network.

The storage 42 stores therein MFP management information 42b for managing MFPs.

Figure 6:
FIG. 6 is a diagram illustrating an example of MFP management information according to the first through fourth embodiments.

FIG. 6 is a diagram illustrating an example of the MFP management information 42b.

As illustrated in FIG. 6, the MFP management information 42b is information in which an MFP ID that is identification information of an MFP is associated with an administrator ID that is identification information of an administrator of the MFP. As illustrated in FIG. 5, the storage 42 is capable of storing therein payment code management information 42c. The payment code management information 42c is information for managing payment codes issued by the online payment service 50 (see FIG. 1).

FIG. 7 is a diagram illustrating an example of the payment code management information 42c.

As illustrated in FIG. 7, the payment code management information 42c is information in which a payment code is associated with an MFP ID and a job ID.

The controller 43 illustrated in FIG. 5 includes for example a processor such as a CPU or an MPU, a ROM device storing therein programs and various data, and a RAM device that is used as a work area of the CPU. The processor of the controller 43 executes the programs stored in the ROM device of the controller 43 or in the storage 42. Through execution of the computer programs stored in the ROM device of the controller 43 or in the storage 42, the processor of the controller 43 controls the communication section 41 and the storage 42.

Through execution of the computer programs (specifically, the payment program 42a) stored in the ROM device of the controller 43 or in the storage 42, the processor of the controller 43 functions as a fee calculation section 43a and a payment communication section 43b. The fee calculation section 43a calculates a fee necessary for outputting an image or a document in accordance with a specific standard. The necessary fee is a fee that the user has to pay for causing the output section 90 to output an image and/or a document. In the first embodiment, the fee calculation section 43a calculates the fee on the basis of a result of reading of a document by the scanner 33 (see FIG. 3). The payment communication section 43b performs communication for payment via the online payment service 50 (see FIG. 1).

Figure 8:
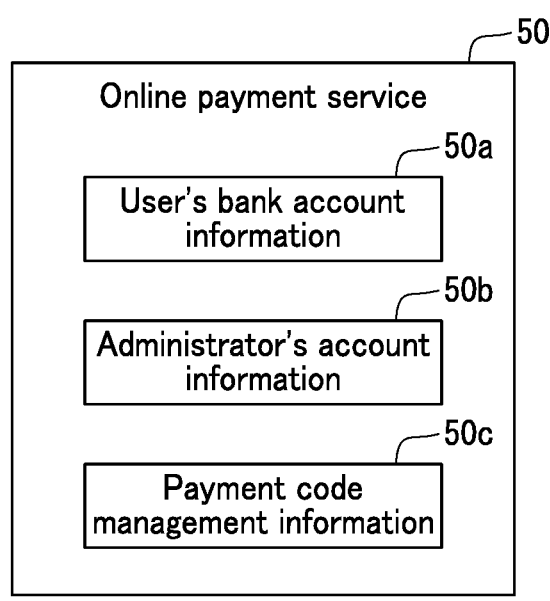
FIG. 8 is a diagram illustrating an example of information stored in an online payment service according to the first through fourth embodiments.

FIG. 8 is a diagram illustrating an example of information stored in the online payment service 50.

As illustrated in FIG. 8, the online payment service 50 stores therein user's bank account information 50a and administrator's account information 50b. The user's bank account information 50a indicates information of a user's bank account for each user ID that is identification information of a user. The administrator's account information 50b indicates information of an account of an administrator of the MFP 30 for each administrator ID.

The user's bank account information 50a includes information about the user's bank account, such as the name of a bank that manages the user's bank account and an account number of the user's bank account. The user can register information of their bank account in the user's bank account information 50a in the online payment service 50 for example through the operation section 21 (see FIG. 2) of the user terminal 20 (see FIG. 2) via the payment program 25a (see FIG. 2).

The administrator can register information of their account in the administrator's account information 50b in the online payment service 50 for example through a given personal computer (PC) via the Internet. Note that the administrator's account is not a bank account, but is an account managed by the online payment service 50.

The online payment service 50 is capable of storing therein payment code management information 50c for managing payment codes.

FIG. 9 is a diagram illustrating an example of the payment code management information 50c.

As illustrated in FIG. 9, the payment code management information 50c is information in which a payment code is associated with an administrator ID, a fee, and a computer ID that is identification information of a computer.

Next, the following describes operations of the output system 10.

First, the following describes operations of the output system 10 from input of an instruction to execute a scan-external-storage job to the MFP 30 up to display of a two-dimensional code by the MFP 30. The scan-external-storage job is a job of storing an image read from a document by the scanner 33 in an external storage medium. In the first embodiment, the external storage medium is the USB memory 11.

Figure 10:
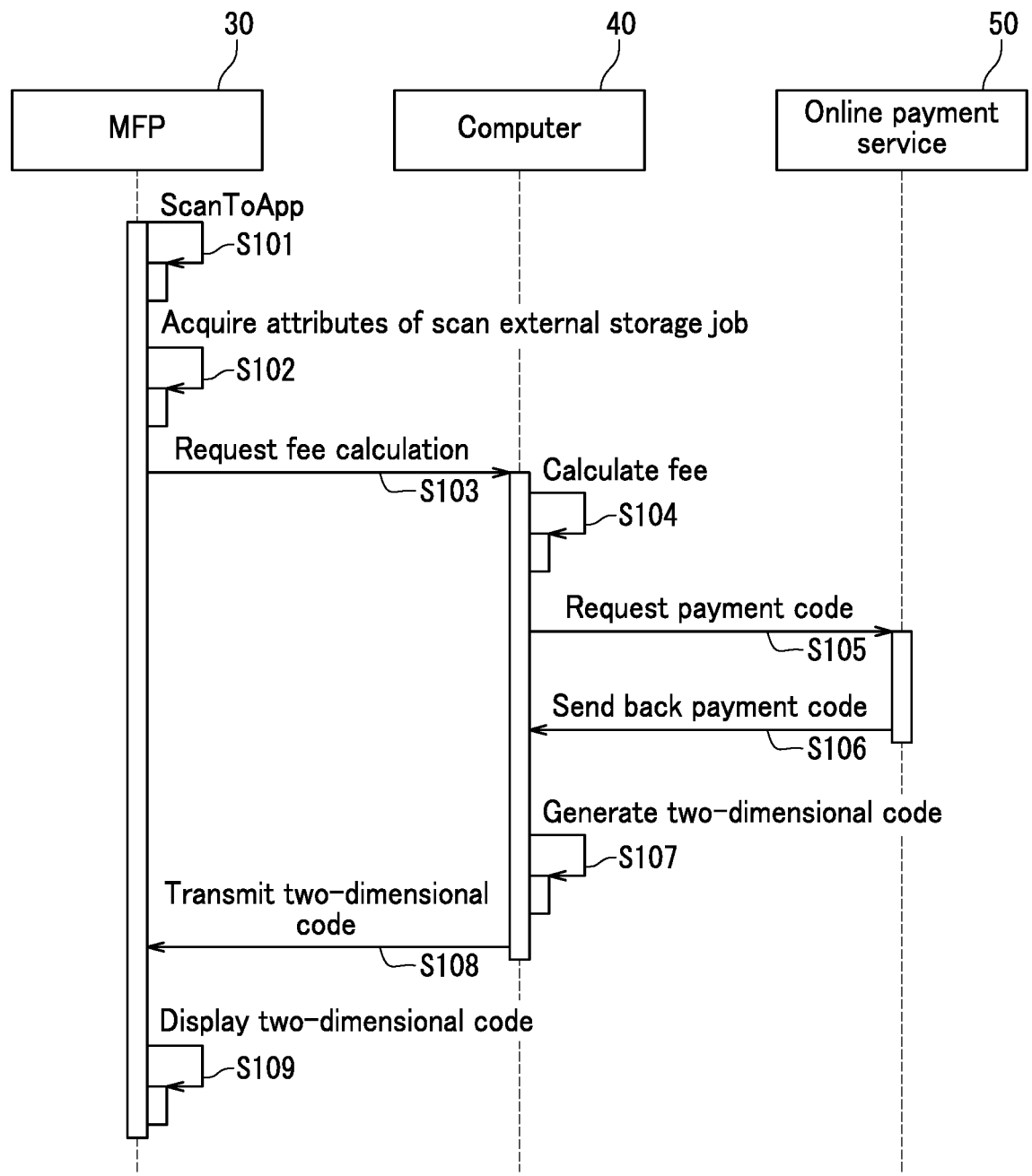
FIG. 10 is a sequence diagram of operations of the output system in the first embodiment up to display of a two-dimensional code by the MFP to which an instruction to execute a scan-external-storage job is input.

FIG. 10 is a sequence diagram of the operations of the output system 10 from input of the instruction to execute the scan-external-storage job to the MFP 30 up to display of the two-dimensional code by the MFP 30.

The user can connect the USB memory 11 as the external storage medium to the USB port 37. Also, the user can input the instruction to execute the scan-external-storage job through the operation section 31. When the instruction to execute the scan-external-storage job is input through the operation section 31, the image storing section 39a of the MFP 30 executes a specific operation (S101). The specific operation is an "operation (hereinafter referred to as "ScanToApp") of storing an image 38b read from a document by the scanner 33 in a particular region of the storage 38 allocated to the scan-external-storage program 38a". Here, the image storing section 39a stores in the image management information 38c, an image ID of the image 38b stored at S101 in association with a job ID of the current job.

Figure 11:
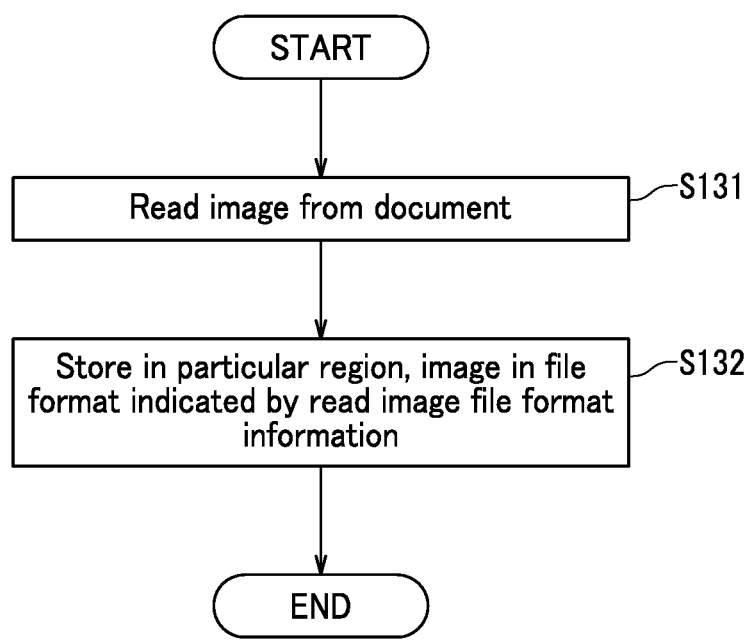
FIG. 11 is a flowchart of operations of the MFP when executing ScanToApp in the first embodiment.

FIG. 11 is a flowchart of operations of the MFP 30 when executing ScanToApp.

As illustrated in FIG. 11, the image storing section 39a reads an image from a document through the scanner 33 (S131).

Next, the image storing section 39a stores the image 38b read at S101 in a particular region of the storage 38 allocated to the scan-external-storage program 38a (S132) and ends the operations illustrated in FIG. 11. Note that the image 38b is stored in the particular region in a file format indicated by the read image file format information 38d.

As illustrated in FIG. 10, after the process at S101, the payment code notification section 39b of the MFP 30 acquires attributes of the current scan-external-storage job (S102).

Here, the attributes of the scan-external-storage job include for example page number information, color information, recording medium size information, collection information, and magnification information. The page number information indicates the number of pages of the image in an image file. The image file is a file of the image stored in the particular region of the storage 38 allocated to the scan-external-storage program 38a at S101. The color information indicates whether data of the image in the image file are monochrome data or color data. The recording medium size information indicates a size of a recording medium in the image file. The collection information indicates the number of pages of the document collected in a page in the image file. The magnification information indicates magnification at which the image has been read by the scanner 33.

The payment code notification section 39b determines the page number information on the basis of a result of reading of the document by the scanner 33.

The payment code notification section 39b determines the color information in accordance with a setting in the instruction to execute the scan-external-storage job input through the operation section 31. However, the payment code notification section 39b may determine the color information on the basis of the result of reading of the document by the scanner 33. For example, in the instruction to execute the scan-external-storage job input through the operation section 31, it is specified that whether to store the image data in the image file as monochrome data or color data should be automatically determined. In this case, the payment code notification section 39b determines the color information depending on a color of the document read by the scanner 33. Alternatively, in the instruction to execute the scan-external-storage job input through the operation section 31, it is specified that the image data in the image file should be stored as color data. In this case, the payment code notification section 39b may be configured to cause the image data in the image file to be stored as monochrome data when the document read by the scanner 33 is in monochrome.

The payment code notification section 39b determines the recording medium size information in accordance with a setting in the instruction to execute the scan-external-storage job. However, the payment code notification section 39b may determine the recording medium size information on the basis of the result of reading of the document by the scanner 33. For example, in the instruction to execute the scan-external-storage job input through the operation section 31, "automatic" is specified as the size of the recording medium. In this case, the payment code notification section 39b may automatically determine the recording medium size information appropriately depending on a size of the document read by the scanner 33.

The payment code notification section 39b determines the collection information and the magnification information in accordance with settings in the instruction to execute the scan-external-storage job input through the operation section 31.

After the process at S102, the payment code notification section 39b transmits to the computer 40 a request to calculate a fee on the basis of the attributes acquired at S102 (S103). Here, the payment code notification section 39b transmits to the computer 40 an MFP ID of the MFP 30 and the job ID of the current job together with the request at S103.

Upon receiving the request transmitted from the MFP 30 at S103, the fee calculation section 43a of the computer 40 calculates a fee for the current scan-external-storage job on the basis of the attributes transmitted from the MFP 30 and a specific calculation standard (S104). The attributes transmitted from the MFP 30 are the attributes acquired at S102. Therefore, the MFP 30 transmits to the computer 40 the request to calculate a fee at S103 together with the attributes acquired at S102.

Next, the payment communication section 43b of the computer 40 requests a payment code for the fee calculated at S104 from the online payment service 50 (S105). Here, the payment communication section 43b includes in the request at S105 a computer ID of the computer 40 and an administrator ID that is associated with the MFP ID transmitted together with the request at S103 from the MFP 30 in the MFP management information 42b.

Therefore, the online payment service 50 issues a payment code in response to the request at S105 and sends back the payment code to the computer 40 (S106). Note that the online payment service 50 stores in the payment code management information 50c the issued payment code in association with the administrator ID, the fee, and the computer ID that are included in the request at S105.

The payment communication section 43b of the computer 40 generates a two-dimensional code that indicates the payment code sent back from the online payment service 50 at S106 (S107). The two-dimensional code is for example a QR CODE (registered Japanese trademark). Note that the payment communication section 43b stores in the payment code management information 42c the payment code sent back from the online payment service 50 at S106 in association with the MFP ID and the job ID that have been transmitted from the MFP 30 at S103.

Next, the payment communication section 43b transmits the two-dimensional code generated at S107 to the MFP 30 (S108).

Therefore, the payment code notification section 39b of the MFP 30 displays in the display section 32 the two-dimensional code transmitted from the computer 40 at S108 (S109).

Next, the following describes operations of the output system 10 from reading of the two-dimensional code by the user terminal 20 up to completion of the scan-external-storage job by the MFP 30.

Figure 12:
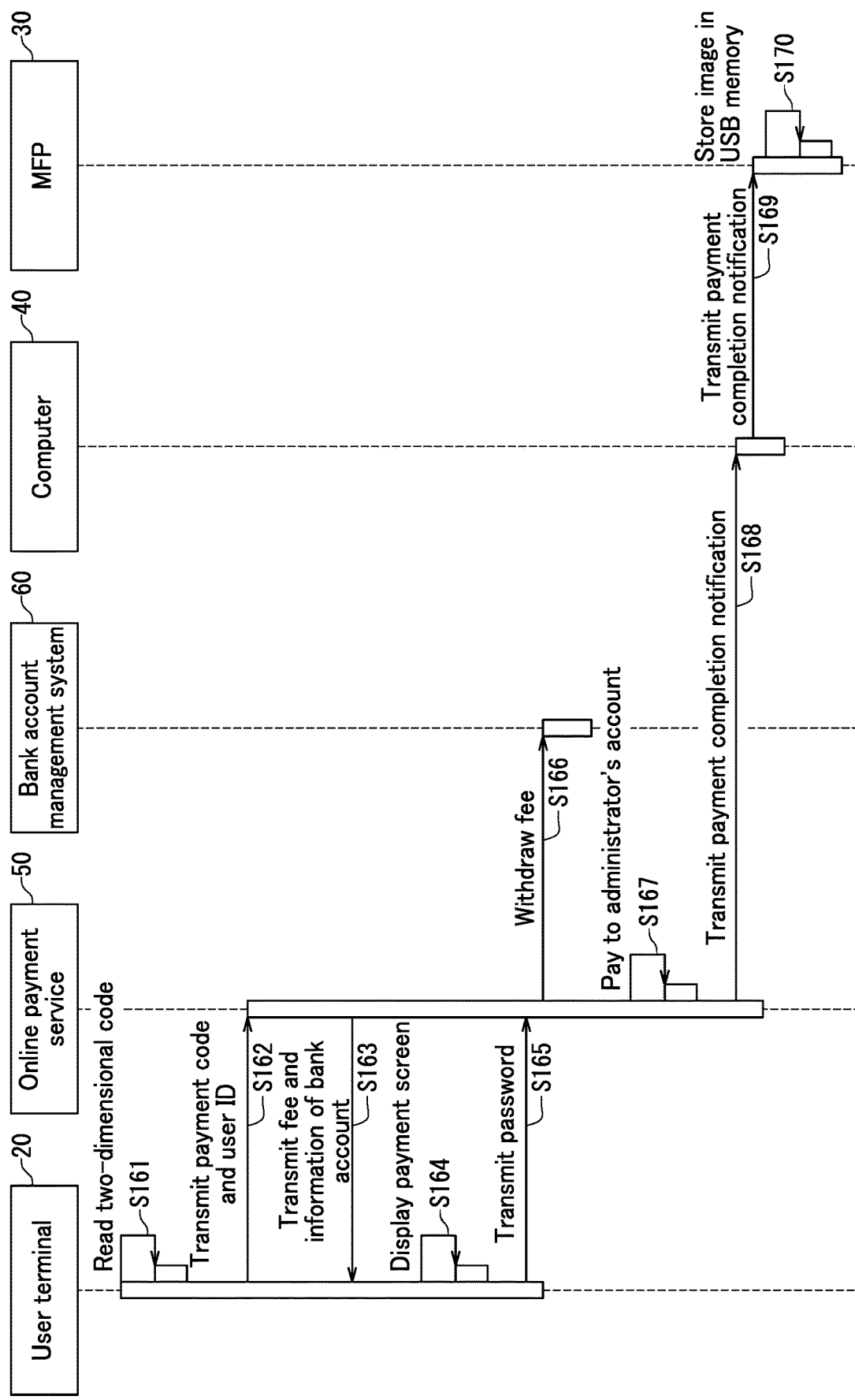
FIG. 12 is a sequence diagram of operations of the output system in the first embodiment from reading of the two-dimensional code by the user terminal to completion of the scan-external-storage job by the MFP.

FIG. 12 is a sequence diagram of the operations of the output system 10 from reading of the two-dimensional code by the user terminal 20 up to completion of the scan-external-storage job by the MFP 30.

The user can operate the user terminal 20 to cause the imaging section 23 of the user terminal 20 to read the two-dimensional code displayed in the display section 32 of the MFP 30 at S109. When the user terminal 20 is operated to cause the imaging section 23 to read the two-dimensional code displayed in the display section 32, the payment instruction section 26a of the user terminal 20 causes the imaging section 23 to read the two-dimensional code displayed in the display section 32 as illustrated in FIG. 12 (S161).

Next, the payment instruction section 26a interprets the two-dimensional code read at S161 and transmits the payment code indicated by the two-dimensional code and a user ID to the online payment service 50 (S162).

Therefore, on the basis of the payment code and the user ID that have been transmitted from the user terminal 20 at S162, the online payment service 50 sends back to the user terminal 20 a fee and information of a bank account (S163). The fee is associated with the payment code in the payment code management information 50c, and the information of the bank account is associated with the user ID in the user's bank account information 50a.

When the fee and the information of the bank account are transmitted from the online payment service 50, the payment instruction section 26a of the user terminal 20 displays in the display section 22 a payment screen 70 (see FIG. 13) for payment of the fee (S164).

Figure 13:
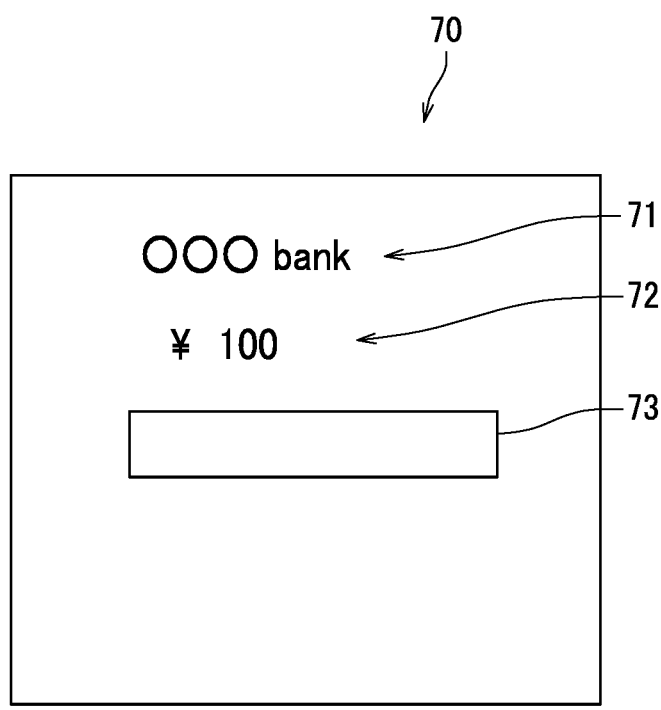
FIG. 13 is a diagram illustrating an example of a payment screen displayed in a display section of the user terminal in the first through fourth embodiments.

FIG. 13 is a diagram illustrating an example of the payment screen 70.

As illustrated in FIG. 13, the payment screen 70 includes a first text 71, a second text 72, and a textbox 73. The first text 71 indicates the information of the bank account transmitted from the online payment service 50. The second text 72 indicates the fee transmitted from the online payment service 50. A password of the bank account is to be entered in the textbox 73. Specifically, a password for causing the bank account management system 60 to authorize withdrawal of the fee from the bank account is to be entered in the textbox 73.

As illustrated in FIG. 13, the information of the bank account is displayed in the payment screen 70. In the first embodiment, the name of a bank is displayed in the payment screen 70 as the information of the bank account. However, information other than the name of a bank may be displayed in the payment screen 70 as the information of the bank account. Information other than the name of a bank may be displayed in the payment screen 70 in addition to the name of a bank. Alternatively, information other than the name of a bank may be displayed in the payment screen 70 instead of the name of a bank. Note that it is only required that among information of the bank account, information to be displayed in the payment screen 70 is sent back at S163.

As illustrated in FIG. 12, when the password of the bank account is entered in the textbox 73, the payment instruction section 26*a* transmits the entered password to the online payment service 50 (S165).

Therefore, the online payment service 50 withdraws a specific fee from a specific first account only when the password transmitted from the user terminal 20 at S165 is correct (S166). The specific first account is a bank account that is associated with the user ID transmitted from the user terminal 20 at S162 in the user's bank account information 50*a*, among bank accounts managed by the bank account management system 60. The specific fee is the fee that is associated with the payment code transmitted from the user terminal 20 at S162 in the payment code management information 50*c*.

Next, the online payment service 50 pays the fee withdrawn at S166 to a specific second account (S167). The specific second account is an account that is associated with a specific administrator ID in the administrator's account information 50*b*. The specific administrator ID is the administrator ID that is associated with the payment code transmitted from the user terminal 20 at S162 in the payment code management information 50*c*.

Therefore, when the password of the specific first account is correctly entered in the textbox 73, the online payment service 50 withdraws the fee from the specific first account and pays the fee withdrawn from the specific first account to the specific second account.

Next, the online payment service 50 transmits to the specific computer 40 a payment completion notification that notifies completion of payment of the fee together with the payment code transmitted from the user terminal 20 at S162 (S168). The specific computer 40 is the computer having the computer ID that is associated with the payment code transmitted from the user terminal 20 in the payment code management information 50*c*.

When the payment completion notification has been transmitted from the online payment service 50 at S168, the payment communication section 43*b* of the computer 40 transmits a payment completion notification to the MFP 30 having a specific MFP ID (S169). The payment completion notification notifies completion of payment of the fee for the job having the job ID that is associated with the payment code transmitted together with the payment completion notification from the online payment service 50 at S168 in the payment code management information 42*c*. The specific MFP ID is the MFP ID that is associated with the payment code transmitted from the online payment service 50 in the payment code management information 42*c*.

When the payment completion notification has been transmitted from the computer 40 at S169, the externally storing section 39*c* of the MFP 30 stores in the USB memory 11 the image 38*b* having the image ID that is associated with the job ID indicated in the payment completion notification (S170) in the image management information 38*c*. Therefore, when the online payment service 50 pays the fee to the specific second account, the image 38*b* is stored in (output to) the USB memory 11 by the externally storing section 39*c*, which is the output section 90. Note that the externally storing section 39*c* may store the image 38*b* and/or the document in the USB memory 11.

As described above, the output system 10 includes the output section 90, the fee calculation section 43*a*, the payment code notification section 39*b*, and the display section 32. The output section 90 outputs an image and/or a document when a fee has been paid via the online payment service 50 using a payment code notified by the payment code notification section 39*b*. Therefore, the output system 10 stores in the storage 38 an image generated by reading of a document by the scanner 33 (S101), and stores the image in the USB memory 11 as an external storage medium (S170) after payment of an accurate fee based on a result of the reading (S165 to S167). As a result, convenience is improved since execution of the scan-external-storage job of "reading an image from a document by the scanner 33 and storing the image in an external storage medium" is not suspended by delay of payment of the fee.

Although the "external storage medium" is the USB memory in the first embodiment of the present disclosure, the external storage medium may be a storage medium other than the USB memory, such as for example an SD card.

Second Embodiment

The following describes the output system (document print system) 10 according to a second embodiment of the present disclosure.

FIG. 1 also illustrates the output system 10 according to the second embodiment. The output system 10 according to the second embodiment differs from the output system 10 according to the first embodiment in that an image is printed (output) in response to payment of a fee by the user.

As illustrated in FIG. 1, the output system 10 according to the second embodiment includes the user terminal 20 (see FIG. 2), the multifunction peripheral (MFP) 30 as an image forming apparatus, the computer 40, the online payment service 50 (see FIGS. 8 and 9), the bank account management system 60, and the output section 90 (see FIG. 3).

In the second embodiment, an image is printed on (output to) a recording medium by the MFP 30 in response to payment of the fee by the user. Specifically, the MFP 30 executes printing of a document in response to payment of the fee by the user. Note that the document is stored in the USB memory 11 as an external storage medium.

Figure 14:
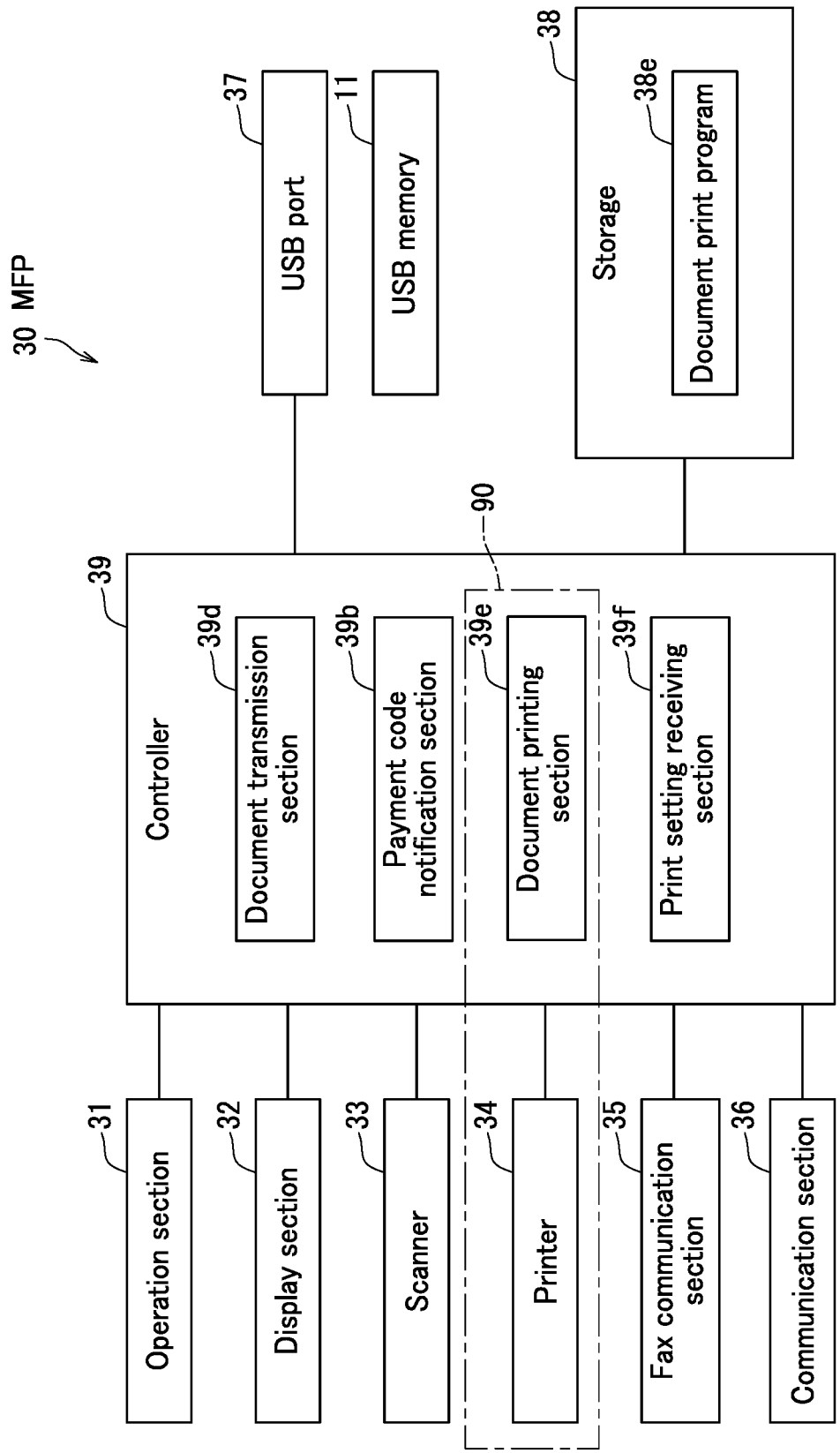
FIG. 14 is a block diagram of the MFP according to the second embodiment.

FIG. 14 is a block diagram of the MFP 30 according to the second embodiment.

As illustrated in FIG. 14, the MFP 30 includes the operation section 31, the display section 32, the scanner 33, the printer 34, the fax communication section 35, the communication section 36, the USB port 37, the storage 38, and the controller 39. The output section 90 in the second embodiment includes the printer 34 and a document printing section 39*e*.

Figure 15:
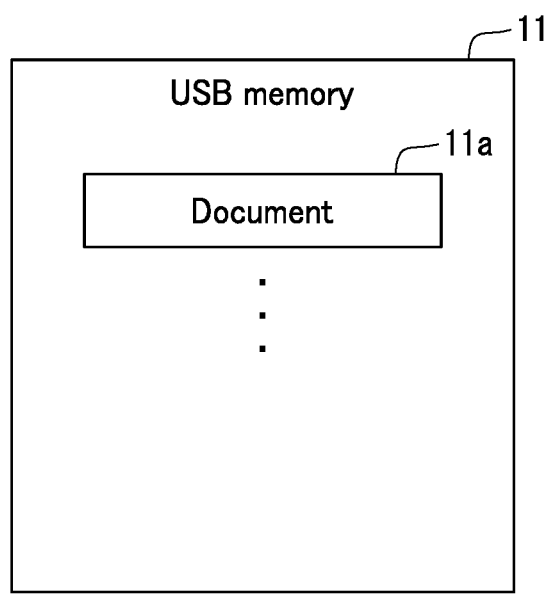
FIG. 15 is a diagram illustrating an example of contents stored in a USB memory according to the second embodiment.

FIG. 15 is a diagram illustrating an example of contents stored in the USB memory 11.

As illustrated in FIG. 15, the USB memory 11 is capable of storing therein at least one document 11*a*. Examples of the document 11*a* include a portable document format (PDF)

document, a MICROSOFT® Word document, a MICROSOFT EXCEL® document, a MICROSOFT POWERPOINT® document, a tagged image file format (TIFF) document, and a joint photographic experts group (JPEG) document. The document 11a may include print settings for the document 11a itself.

The storage 38 illustrated in FIG. 14 stores therein a document print program 38e for executing a document print job. The document print program 38e may be installed in the MFP 30 during manufacture of the MFP 30. Alternatively, the document print program 38e may be additionally installed in the MFP 30 from an external storage medium such as a USB memory. Alternatively, the document print program 38e may be additionally installed in the MFP 30 via a network.

Through execution of computer programs (specifically, the document print program 38e) stored in the ROM device of the controller 39 or in the storage 38, the processor of the controller 39 functions as a document transmission section 39d, the payment code notification section 39b, the document printing section 39e, and a print setting receiving section 39f. The document transmission section 39d transmits a document 11a stored in the USB memory 11 to the computer 40. The payment code notification section 39b notifies a payment code issued by the online payment service 50 (see FIG. 1) for a fee calculated by the computer 40. When the fee is paid via the online payment service 50 using the payment code notified by the payment code notification section 39b, the document printing section 39e executes printing through the printer 34, which is a printing device, on the basis of print data. The print setting receiving section 39f receives print settings for the document 11a.

Figure 16:
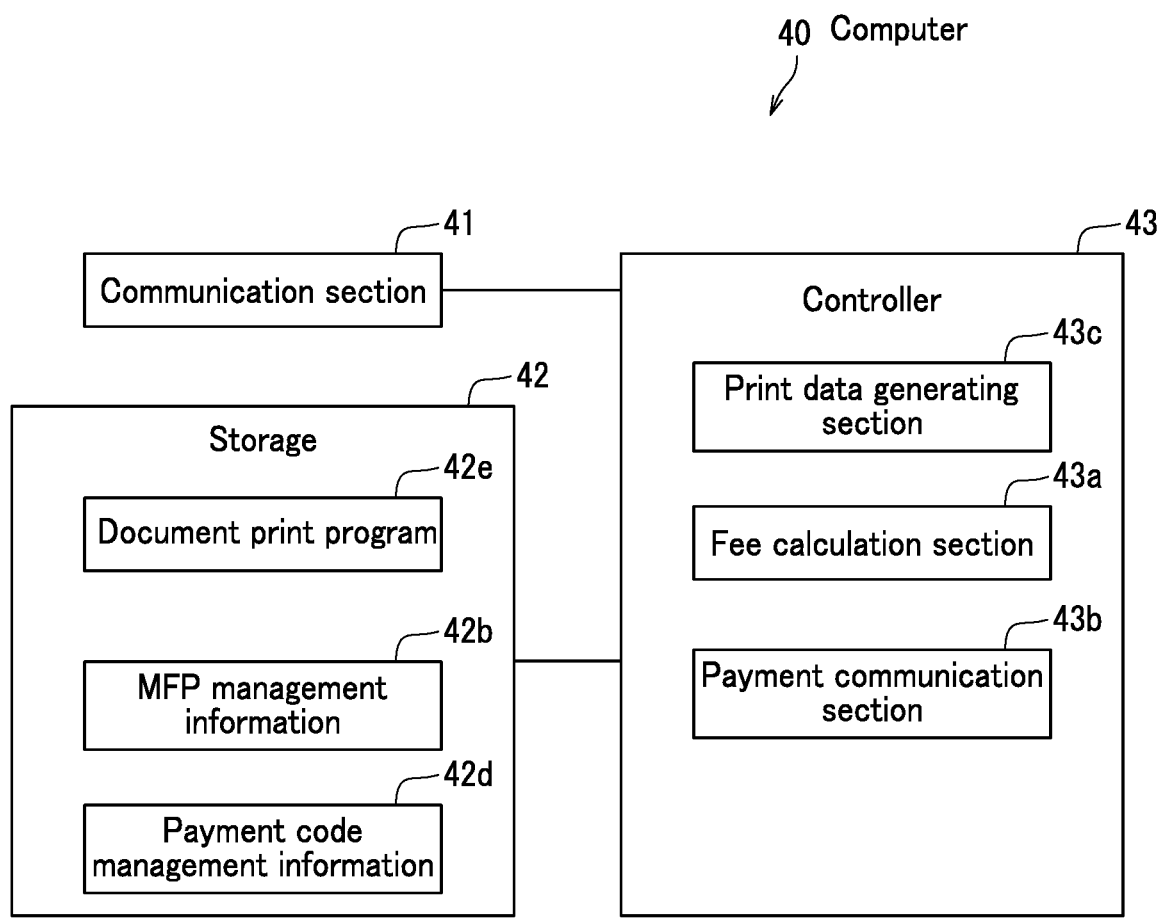
FIG. 16 is a block diagram of the computer according to the second embodiment.

FIG. 16 is a block diagram of the computer 40 according to the second embodiment.

As illustrated in FIG. 16, the computer 40 includes the communication section 41, the storage 42, and the controller 43.

The storage 42 stores therein a document print program 42e for executing the document print job. The document print program 42e may be installed in the computer 40 during manufacture of the computer 40. Alternatively, the document print program 42e may be additionally installed in the computer 40 from an external storage medium such as a USB memory, a compact disk (CD), or a digital versatile disk (DVD). Alternatively, the document print program 42e may be additionally installed in the computer 40 via a network.

The storage 42 stores therein the MFP management information 42b (see FIG. 6) for managing MFPs.

As illustrated in FIG. 16, the storage 42 is capable of storing therein payment code management information 42d. The payment code management information 42d is information for managing payment codes issued by the online payment service 50 (see FIG. 1).

FIG. 17 is a diagram illustrating an example of the payment code management information 42d.

As illustrated in FIG. 17, the payment code management information 42d is information in which a payment code is associated with an MFP ID and a print data ID that is identification information of print data.

Through execution of computer programs (specifically, the document print program 42e) stored in the ROM device of the controller 43 or in the storage 42, the processor of the controller 43 functions as a print data generating section 43c, the fee calculation section 43a, and the payment communication section 43b. The print data generating section 43c generates print data of a document. The fee calculation section 43a calculates a fee on the basis of the print data generated by the print data generating section 43c.

Next, the following describes operations of the output system 10.

First, the following describes operations of the output system 10 up to display of a two-dimensional code by the MFP 30 to which an instruction to execute the document print job is input. The document print job is a job of printing a document.

Figure 18:
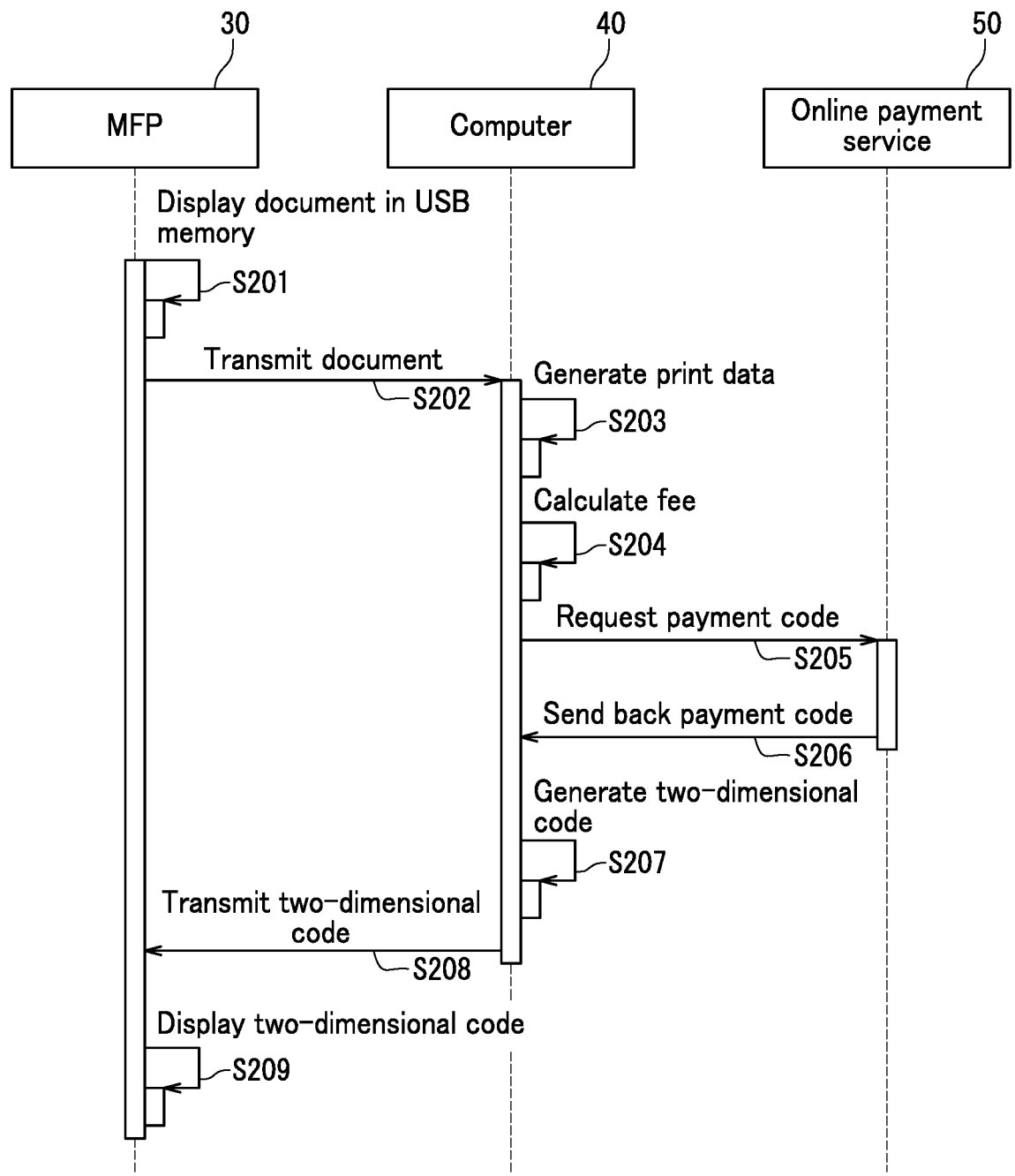
FIG. 18 is a sequence diagram of operations of the output system in the second embodiment up to display of a two-dimensional code by the MFP to which an instruction to execute a document print job is input.

FIG. 18 is a sequence diagram of the operations of the output system 10 up to display of the two-dimensional code by the MFP 30 to which the instruction to execute the document print job is input.

The user can connect the USB memory 11 as the external storage medium to the USB port 37. Also, the user can input an instruction to display at least one document 11a stored in the USB memory 11 through the operation section 31. When the instruction to display the at least one document 11a stored in the USB memory 11 is input through the operation section 31, the document transmission section 39d of the MFP 30 displays in the display section 32 a list of the at least one document 11a stored in the USB memory 11 (S201). Here, the document transmission section 39d is also capable of displaying a preview image for each of the at least one document 11a in response to an instruction input through the operation section 31.

Through the operation section 31, the user can select a document 11a that the user wants to print from among the at least one document 11a displayed in the display section 32 at S201. Here, the user can also specify print settings through the operation section 31 upon selection of the document 11a that the user wants to print. Specifically, specifying print settings refers to specifying print settings to be applied to the document 11a that the user wants to print. Examples of print settings that can be specified include a setting of the number of copies to be printed, a setting of a size of a recording medium to be printed, a setting indicating which of monochrome printing and color printing is to be performed, and a setting indicating which of duplex printing and single-side printing is to be performed.

When the document 11a that the user wants to print is selected through the operation section 31, the document transmission section 39d transmits the document 11a to the computer 40 using for example a server message block (SMB) protocol (S202). Here, in a situation in which print settings for the document 11a that the user wants to print are specified upon selection of the document 11a, the print setting receiving section 39f receives the print settings for the document 11a. When the print settings are received by the print setting receiving section 39f, the document transmission section 39d transmits to the computer 40 the print settings together with the document 11a at S202.

Upon receiving the document 11a transmitted from the MFP 30 at S202, the print data generating section 43c of the computer 40 generates print data of the document 11a (S203). That is, the print data generating section 43c generates print data of the document 11a. Here, in a situation in which print settings are received together with the document 11a, the print data generating section 43c generates the print data of the document 11a in accordance with the print settings. The storage 42 temporarily stores therein the print data generated by the print data generating section 43c.

Note that the print data include information necessary for calculation of a fee, such as page number information indicating the number of pages to be printed, sheet number information indicating the number of sheets of a recording medium to be printed, a recording medium size information indicating a size of the recording medium to be printed, color information indicating which of monochrome printing and color printing is to be performed, and duplex or singe-side printing information indicating which of duplex printing and single-side printing is to be performed.

The print data generating section 43c for example determines the page number information and the sheet number information on the basis of the number of pages of the document 11a and various print settings. The various print settings are for example a setting of the number of copies to be printed and a setting indicating which of duplex printing and single-side printing is to be performed, which settings are included in the print settings transmitted together with the document 11a at S202.

In a situation in which first print settings included in the document 11a itself and second print settings transmitted together with the document 11a at S202 include incompatible settings, the print data generating section 43c gives priority to the second print settings. For example, in a situation in which the first print settings include a setting of color printing and the second print settings include a setting of monochrome printing, the print data generating section 43c includes information indicating monochrome printing as color information in the print data.

After the process at S203, the fee calculation section 43a of the computer 40 calculates a fee for the current document print job on the basis of information included in the print data generated at S203 and a specific calculation standard (S204).

Next, the payment communication section 43b of the computer 40 requests a payment code for the fee calculated at S204 from the online payment service 50 (S205). Here, the payment communication section 43b includes in the request at S205 a specific administrator ID and the computer ID of the computer 40. The specific administrator ID is an administrator ID that is associated with the MFP ID transmitted together with the document 11a from the MFP 30 at S202 in the MFP management information 42b.

Therefore, the online payment service 50 issues a payment code in response to the request at S205 and sends back the payment code to the computer 40 (S206). Note that the online payment service 50 stores in the payment code management information 50c the issued payment code in association with the administrator ID, the fee, and the computer ID that are included in the request at S205.

The payment communication section 43b of the computer 40 generates a two-dimensional code that indicates the payment code sent back from the online payment service 50 at S206 (S207). Note that the payment communication section 43b stores in the payment code management information 42d the payment code sent back from the online payment service 50 at S206 in association with the MFP ID transmitted together with the document 11a from the MFP 30 at S202 and a print data ID of the print data generated at S203.

Next, the payment communication section 43b transmits to the MFP 30 the two-dimensional code generated at S207 (S208).

Therefore, the payment code notification section 39b of the MFP 30 displays in the display section 32 the two-dimensional code transmitted from the computer 40 at S208 (S209).

Next, the following describes operations of the output system 10 from reading of the two-dimensional code by the user terminal 20 up to completion of the document print job by the MFP 30.

Figure 19:
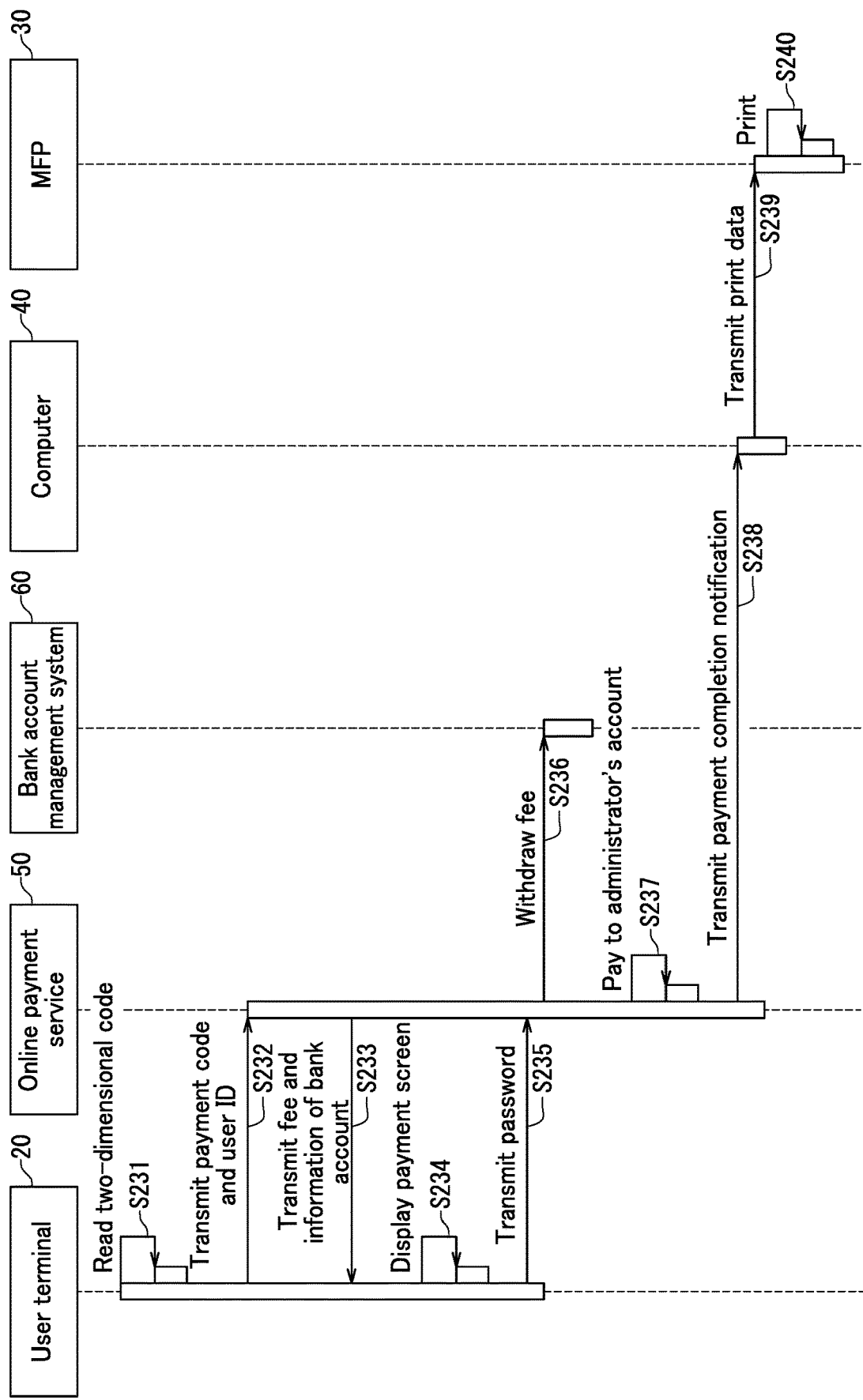
FIG. 19 is a sequence diagram of operations of the output system in the second embodiment from reading of the two-dimensional code by the user terminal to completion of the document print job by the MFP.

FIG. 19 is a sequence diagram of the operations of the output system 10 from reading of the two-dimensional code by the user terminal 20 up to completion of the document print job by the MFP 30.

As illustrated in FIG. 19, processes from S231 to S238 are the same as the processes from S161 to S168 (see FIG. 12) in the first embodiment, respectively. Therefore, description of the processes from S231 to S238 will be omitted.

When the payment completion notification has been transmitted from the online payment service 50 at S238, the payment communication section 43b of the computer 40 transmits specific print data among print data stored in the storage 42 to the MFP 30 having the MFP ID that is associated with a specific payment code in the payment code management information 42d (S239). The specific print data is print data having the print data ID that is associated with the payment code transmitted together with the payment completion notification from the online payment service 50 at S238 in the payment code management information 42d. The specific payment code is the payment code transmitted together with the payment completion notification from the online payment service 50 at S238.

When the print data has been transmitted from the computer 40 at S239, the document printing section 39e of the MFP 30 executes printing through the printer 34 on the basis of the print data (S240). That is, the document printing section 39e prints the document 11a on a recording medium through the printer 34. Therefore, when the online payment service 50 pays the fee to the specific second account, the printer 34 and the document printing section 39e, which are the output section 90, print (output) the document 11a. Note that the printer 34 and the document printing section 39e may print an image and/or the document 11a.

As described above, the output system 10 includes the output section 90, the fee calculation section 43a, the payment code notification section 39b, and the display section 32. The output section 90 outputs an image and/or a document when a fee has been paid via the online payment service 50 using a payment code notified by the payment code notification section 39b. Therefore, the output system 10 generates print data of the document 11a stored in the USB memory 11 connected to the MFP 30 (S203), and executes printing on the basis of the print data (S240) after payment of an accurate fee based on the print data (S235 to S237). As a result, convenience is improved since execution of the document print job is not suspended by delay of payment of the fee. Note that the document print job is a job of printing the document 11a. The document 11a is stored for example in an external storage medium. In the second embodiment, the document 11a is stored in the USB memory 11 connected to the MFP 30.

The print data generating section 43c of the computer 40 generates the print data in accordance with print settings received by the print setting receiving section 39f of the MFP 30. Therefore, the document 11a stored in the USB memory 11 connected to the MFP 30 can be printed in accordance with print settings specified by the user through the MFP 30.

Third Embodiment

The following describes the output system (document print system) 10 according to the third embodiment of the present disclosure.

The output system 10 according to the third embodiment is the same as the output system 10 according to the second embodiment in that an image is printed (output) in response to payment of a fee by the user. However, the output system 10 according to the third embodiment differs from the output system 10 according to the second embodiment in that the fee is calculated on the basis of the number of pages of a document and print settings.

Figure 20:
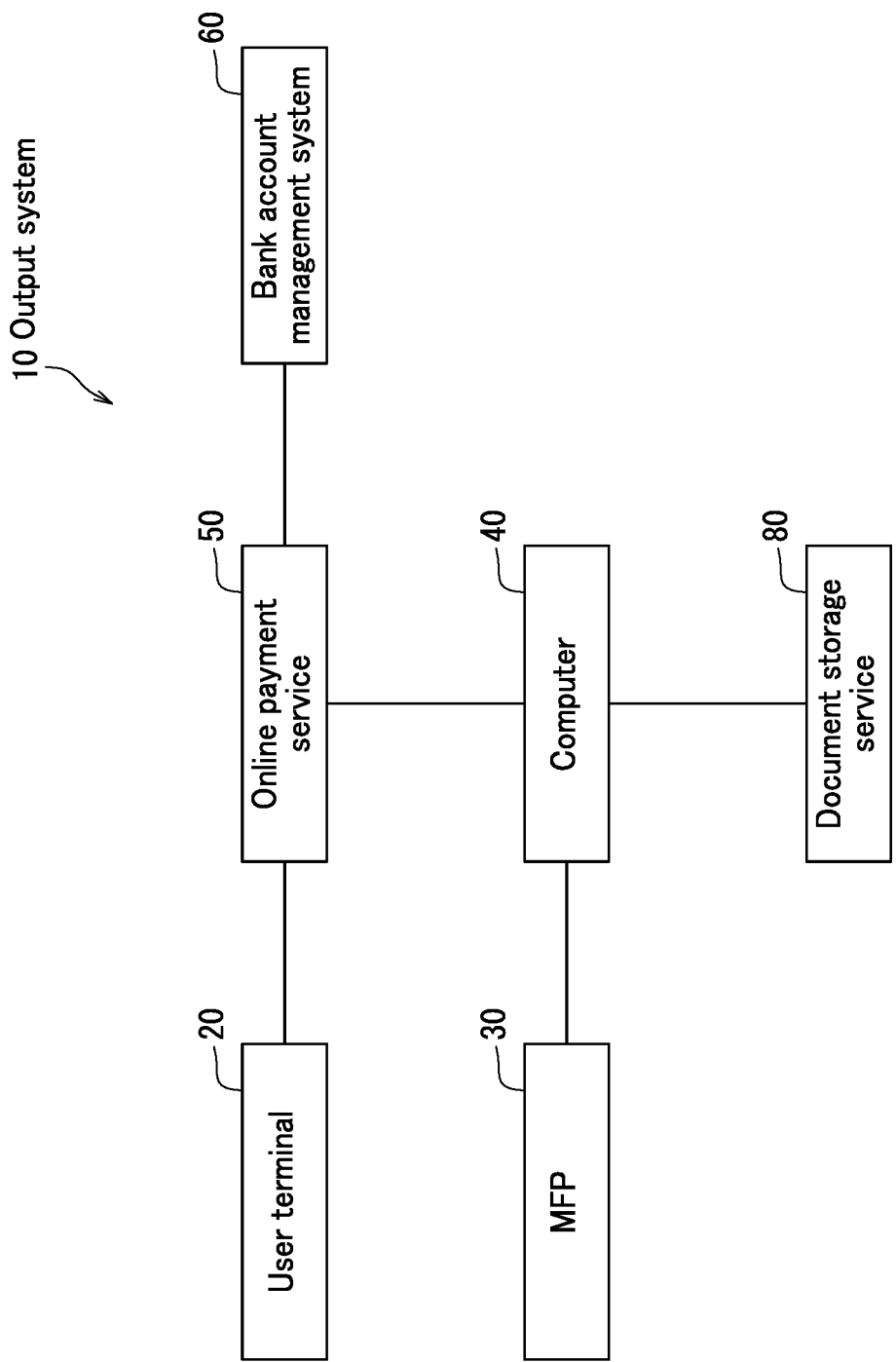
FIG. 20 is a block diagram of the output system according to the third embodiment.

FIG. 20 is a block diagram of the output system 10 according to the third embodiment.

Figure 21:
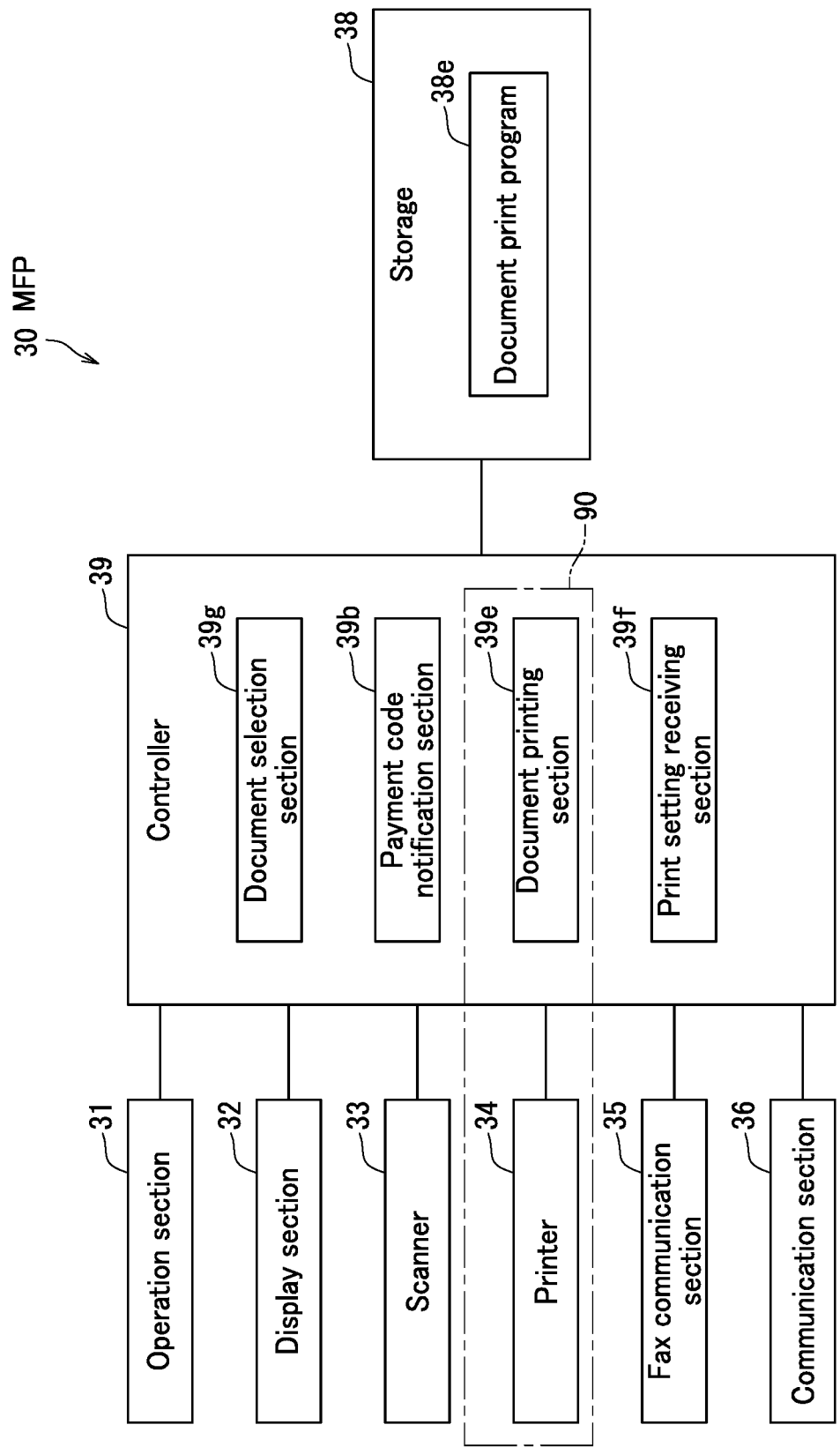
FIG. 21 is a block diagram of the MFP according to the third embodiment.

As illustrated in FIG. 20, the output system 10 includes the user terminal 20, the MFP 30, the computer 40, the online payment service 50 (see FIGS. 8 and 9), the bank account management system 60, a document storage service 80 that stores documents therein, and the output section 90 (see FIG. 21).

FIG. 21 is a block diagram of the MFP 30.

As illustrated in FIG. 21, the MFP 30 includes the operation section 31, the display section 32, the scanner 33, the printer 34, which is a printing device, the fax communication section 35, the communication section 36, the storage 38, and the controller 39.

The storage 38 stores therein the document print program 38*e* for executing a document print job.

Through execution of computer programs (specifically, the document print program 38*e*) stored in the ROM device of the controller 39 or in the storage 38, the processor of the controller 39 functions as a document selection section 39*g*, the payment code notification section 39*b*, the document printing section 39*e*, and the print setting receiving section 39*f*. The document selection section 39*g* selects a document stored in the document storage service 80 (see FIG. 20). The output section 90 in the third embodiment includes the printer 34 and the document printing section 39*e*.

Figure 22:
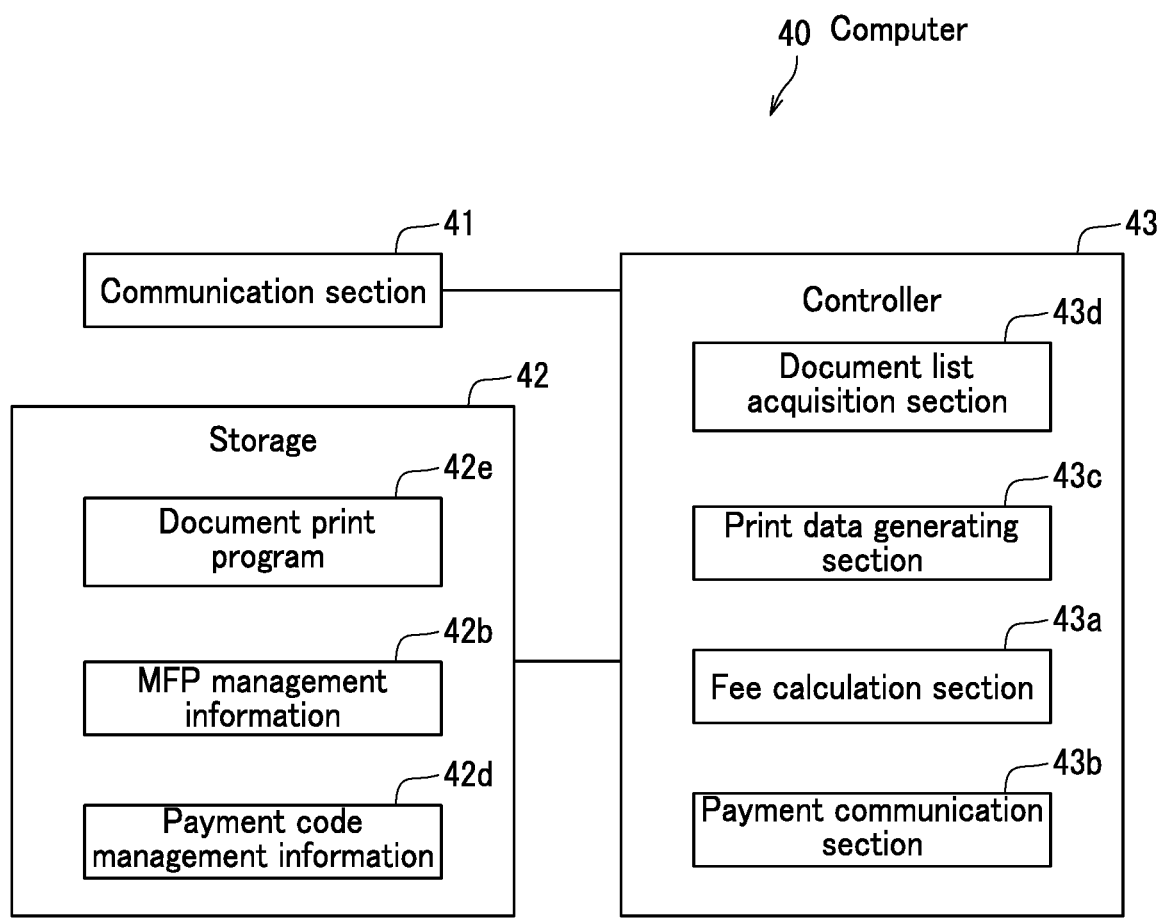
FIG. 22 is a block diagram of the computer according to the third embodiment.

FIG. 22 is a block diagram of the computer 40.

As illustrated in FIG. 22, the computer 40 includes the communication section 41, the storage 42, and the controller 43.

The storage 42 stores therein the document print program 42*e* for executing the document print job.

The storage 42 stores therein the MFP management information 42*b* (see FIG. 6) for managing MFPs.

As illustrated in FIG. 22, the storage 42 is capable of storing therein the payment code management information 42*d* (see FIG. 17).

Through execution of computer programs (specifically, the document print program 42*e*) stored in the ROM device of the controller 43 or in the storage 42, the processor of the controller 43 functions as a document list acquisition section 43*d*, the print data generating section 43*c*, the fee calculation section 43*a*, and the payment communication section 43*b*. The document list acquisition section 43*d* acquires a list (hereinafter referred to as a "document list") of documents stored in the document storage service 80 (see FIG. 20). The fee calculation section 43*a* calculates a fee on the basis of the number of pages of a document and print settings.

Note that the document list includes document IDs that are each identification information of a document.

Figure 23:
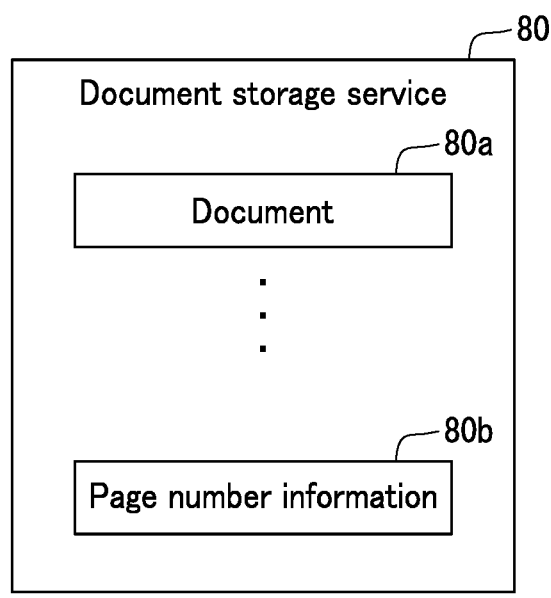
FIG. 23 is a diagram illustrating an example of information stored in a document storage service according to the third embodiment.

FIG. 23 is a diagram illustrating an example of information stored in the document storage service 80.

As illustrated in FIG. 23, the document storage service 80 is capable of storing therein at least one document 80*a* each in association with a user ID. Examples of the document 80*a* include a portable document format (PDF) document, a MICROSOFT® Word document, a MICROSOFT EXCEL® document, a MICROSOFT POWERPOINT® document, a tagged image file format (TIFF) document, and a joint photographic experts group (JPEG) document. The document 80*a* may include printing settings for the document 80*a* itself.

The document storage service 80 is capable of storing therein page number information 80*b* that indicates the number of pages of the document 80*a* in association with a document ID of the document 80*a*.

Next, the following describes operations of the output system 10.

First, the following describes operations of the document storage service 80 when storing therein a new document 80*a*.

Figure 24:
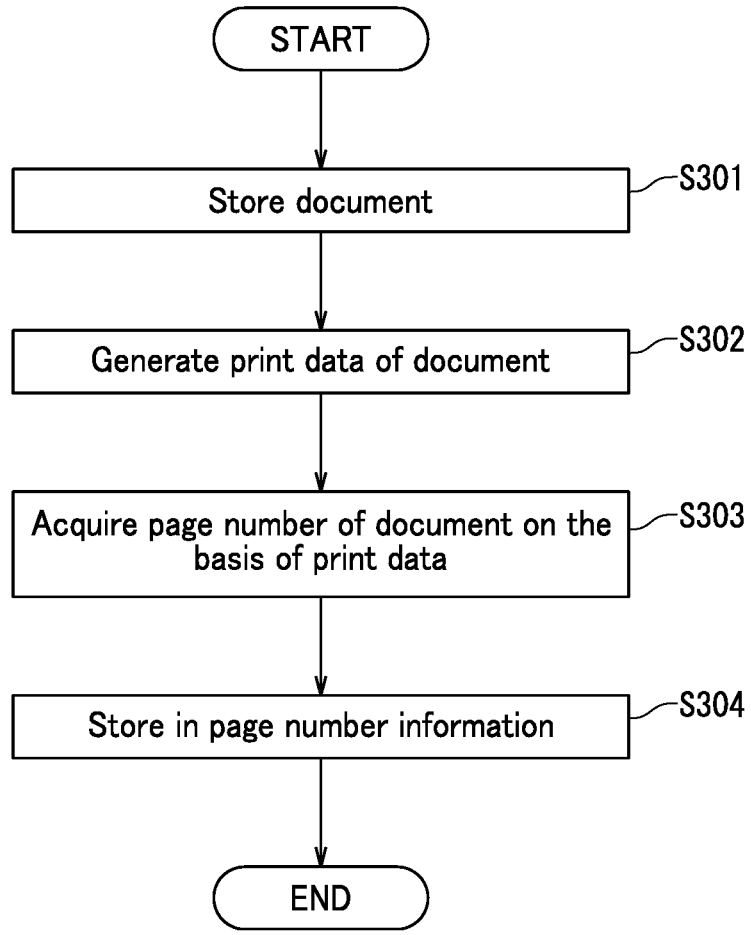
FIG. 24 is a flowchart of operations of the document storage service when storing a new document in the third embodiment.

FIG. 24 is a flowchart of the operations of the document storage service 80 when storing therein a new document 80*a*.

The user can log in to the document storage service 80 through a computer such as the user terminal 20 or a PC to instruct the document storage service 80 to store therein a new document 80*a*.

When storage of the new document 80*a* is instructed, the document storage service 80 stores therein the new document 80*a* in association with the user ID as illustrated in FIG. 24 (S301).

Next, the document storage service 80 generates print data of the document 80*a* stored at S301 (S302), and acquires the number of pages of the document 80*a* on the basis of the print data (S303).

Then, the document storage service 80 stores in the page number information 80*b* the number of pages acquired at S303 in association with the document ID of the document 80*a* stored at S301 (S304) and ends the operations illustrated in FIG. 24.

Next, the following describes operations of the output system 10 up to display of a two-dimensional code by the MFP 30 to which an instruction to execute the document print job is input. The document print job is a job of printing a document.

Figure 25:
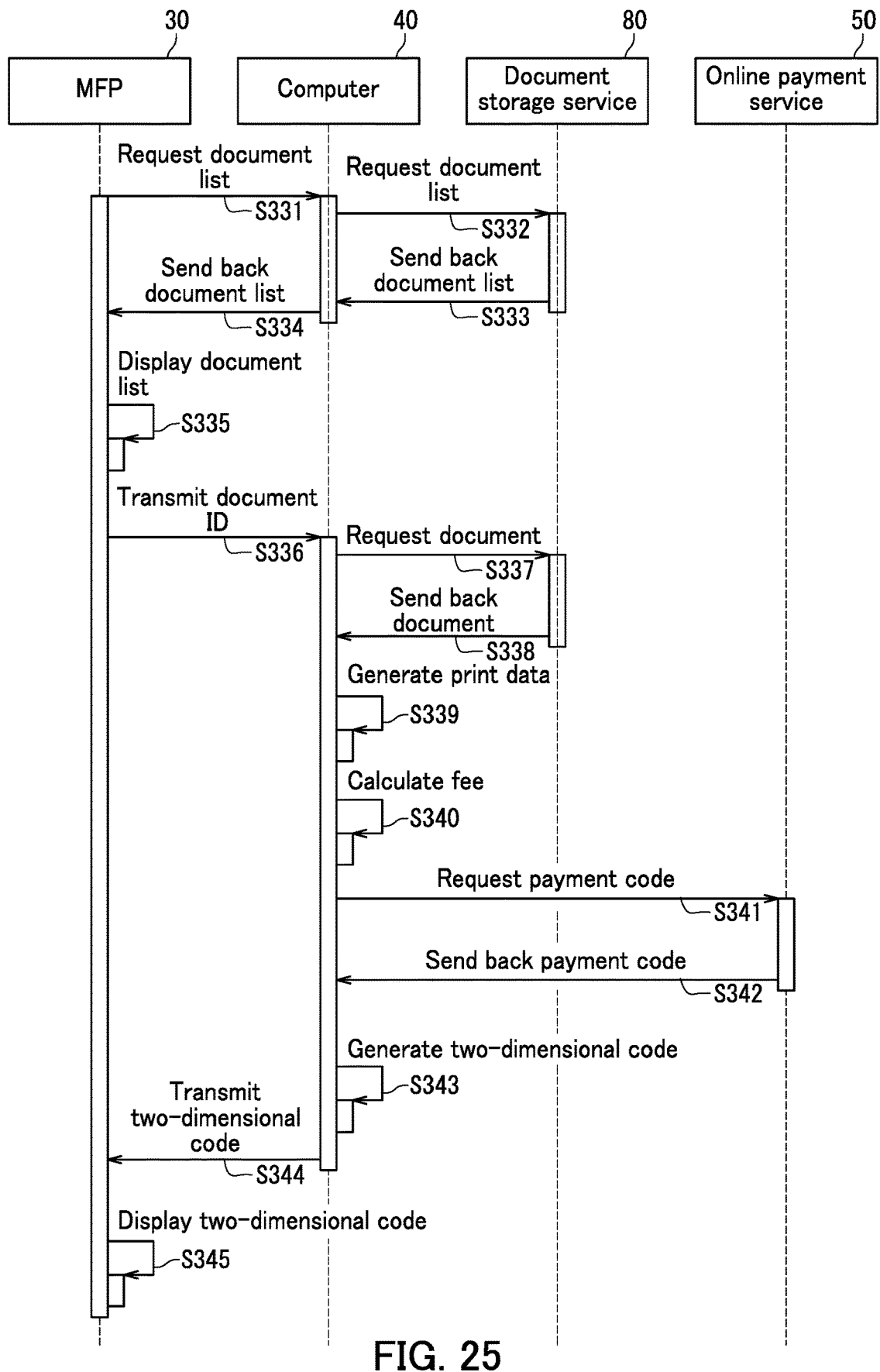
FIG. 25 is a sequence diagram of operations of the output system in the third embodiment up to display of a two-dimensional code by the MFP to which an instruction to execute a document print job is input.

FIG. 25 is a sequence diagram of the operations of the output system 10 up to display of the two-dimensional code by the MFP 30 to which the instruction to execute the document print job is input.

After storing the document 80*a* in the document storage service 80, the user can log in to the MFP 30 through the operation section 31.

When the user logged in to the MFP 30 through the operation section 31, the document selection section 39*g* of the MFP 30 requests from the computer 40 a document list of at least one document 80*a* stored in the document storage service 80 in association with the user ID of the user who logged in (S331).

Next, the document list acquisition section 43*d* of the computer 40 requests from the document storage service 80 the document list requested by the MFP 30 at S331 (S332). Therefore, the document storage service 80 sends back to the computer 40 the document list of the at least one document 80*a* stored in association with the user ID of the user who logged in to the MFP 30 (S333). Here, when sending back the document list to the computer 40, the document storage service 80 may send back to the computer 40, together with the document list, image data of a preview image generated on the basis of the print data generated at S302 for each document indicated in the document list.

Next, the document list acquisition section 43*d* of the computer 40 transmits to the MFP 30 the document list sent back from the document storage service 80 at S333 (S334). Here, in a situation in which the image data of the preview image have been sent back together with the document list from the document storage service 80 at S333, the document list acquisition section 43*d* may transmit to the MFP 30 the image data of the preview image together with the document list.

Therefore, the document selection section 39*g* of the MFP 30 displays in the display section 32 the document list transmitted at S334 (S335). Here, in a situation in which the image data of the preview image have been transmitted together with the document list from the computer 40 at S334, the document selection section 39*g* may display in the display section 32 the preview image of each document together with the document list or separately from the document list.

Through the operation section 31, the user can select a document that the user wants to print from among documents displayed in the display section 32 at S335. Here, through the operation section 31, the user can also specify print settings to be applied to the document that the user wants to print upon selection of the document. Examples of print settings that can be specified include a setting of the number of copies to be printed, a setting of a size of a recording medium to be printed, a setting indicating which of monochrome printing and color printing is to be performed, and a setting indicating which of duplex printing and single-side printing is to be performed.

When the document that the user wants to print is selected through the operation section 31, the document selection section 39*g* transmits a document ID of the selected document to the computer 40 using for example a server message block (SMB) protocol (S336). Here, in a situation in which print settings for the document that the user wants to print are specified through the operation section 31 upon selection of the document, the print setting receiving section 39*f* of the MFP 30 receives the print settings specified through the operation section 31. When the print settings are received by the print setting receiving section 39*f*, the document selection section 39*g* transmits to the computer 40 the print settings together with the document ID at S336.

Upon receiving the document ID transmitted from the MFP 30 at S336, the print data generating section 43*c* of the computer 40 requests from the document storage service 80 the document having the document ID (S337). Therefore, the document storage service 80 sends back to the computer 40 the document 80*a* requested at S337 (S338). Here, the document storage service 80 sends back to the computer 40 the number of pages of the document 80*a* indicated in the page number information 80*b*, together with the document 80*a*.

Upon receiving the document 80*a* sent back from the document storage service 80 at S338, the print data generating section 43*c* of the computer 40 generates print data of the document 80*a* (S339). Here, in a situation in which print settings have been received together with the document ID at S336, the print data generating section 43*c* generates the print data of the document in accordance with the print settings. The print data generating section 43*c* temporarily stores the generated print data in the storage 42.

Note that the print data include various information necessary for calculation of a fee, such as page number information indicating the number of pages to be printed, sheet number information indicating the number of sheets of a recording medium to be printed, a recording medium size information indicating a size of the recording medium to be printed, color information indicating which of monochrome printing and color printing is to be performed, and duplex or singe-side printing information indicating which of duplex printing and single-side printing is to be performed.

The print data generating section 43*c* for example determines the page number information and the sheet number information on the basis of the number of pages of the document and various print settings. The various print settings are for example a setting of the number of copies to be printed and a setting indicating which of duplex printing and single-side printing is to be performed, which settings are included in the print settings transmitted together with the document ID at S336.

In a situation in which print settings included in the document 80*a* itself and print settings transmitted together with the document ID at S336 include incompatible settings, the print data generating section 43*c* gives priority to the print settings transmitted together with the document ID at S336. For example, in a situation in which the print settings included in the document itself include a setting of color printing and the print settings transmitted together with the document ID at S336 include a setting of monochrome printing, the print data generating section 43*c* includes information indicating monochrome printing as color information in the print data.

Note that print data to be printed by the printer 34 is preferably generated by a printer driver suitable for the MFP 30. Therefore, even in a situation in which the print settings transmitted at S336 are identical with the print settings included in the document 80*a* itself, it is preferable to use, as the print data to be printed by the printer 34, print data newly generated by the computer 40 using a printer driver suitable for the MFP 30 at S339, rather than using the print data generated by the document storage service 80 at S302. Note that the printer driver suitable for the MFP 30 is included in the computer 40.

After the process at S339, the fee calculation section 43*a* of the computer 40 calculates a fee for the current document print job on the basis of the number of pages of the document 80*a*, print settings, and a specific calculation standard (S340).

Here, the fee calculation section 43*a* calculates the fee using the number of pages transmitted from the document storage service 80 at S338 as the number of pages of the document 80*a*. Therefore, in a situation in which no print settings have been transmitted at S336 or print settings that have been transmitted at S336 are identical with print settings included in the document 80*a* itself, the fee calculation section 43*a* is capable of executing the process at S340 at a given timing after the process at S338 rather than after the process at S339. Further, in a configuration in which the number of pages is transmitted from the document storage service 80 before the process at S338, the fee calculation section 43*a* is capable of executing the process at S340 at a given timing after the process at S336. The given timing is after the number of pages is transmitted from the document storage service 80, and for example before the process at S337.

For example, in a situation in which duplex printing is specified in a print setting, the number of sheets of the recording medium to be printed for each copy of the document 80*a* is a half of the number of pages of the document 80*a*. The number of sheets may be reflected on the fee by the fee calculation section 43*a*.

Also, in a situation in which a plurality of copies is specified in a print setting, the number of printing surfaces of the recording medium to be printed is obtained by multiplying the number of pages of the document 80*a* by the number of copies. The number of printing surfaces may be reflected on the fee by the fee calculation section 43*a*.

After the process at S340, the payment communication section 43b of the computer 40 requests from the online payment service 50 a payment code for the fee calculated at S340 (S341). Here, the payment communication section 43b includes in the request at S341 the computer ID of the computer 40 and a specific administrator ID. The specific administrator ID is an administrator ID that is associated with the MFP ID transmitted together with the document ID from the MFP 30 at S336 in the MFP management information 42b. Note that the process at S341 can be executed at a given timing after the process at S340. For example, in a situation in which the process at S340 is executed before the process at S339, the process at S341 may be executed before the process at S339.

Therefore, the online payment service 50 issues a payment code in response to the request at S341 and sends back the payment code to the computer 40 (S342). Note that the online payment service 50 stores in the payment code management information 50c the issued payment code in association with the administrator ID, the fee, and the computer ID that are included in the request at S341.

The payment communication section 43b of the computer 40 generates a two-dimensional code such as a QR CODE (registered Japanese trademark) that indicates the payment code sent back from the online payment service 50 at S342 (S343). Note that the payment communication section 43b stores in the payment code management information 42d the payment code sent back from the online payment service 50 at S342 in association with the MFP ID transmitted together with the document ID from the MFP 30 at S336 and a print data ID of the print data generated at S339. The process at S343 can be executed at a given timing after the process at S342. For example, in a situation in which the process at S342 is executed before the process at S339, the process at S343 may be executed before the process at S339.

Next, the payment communication section 43b transmits to the MFP 30 the two-dimensional code generated at S343 (S344).

Therefore, the payment code notification section 39b of the MFP 30 displays in the display section 32 the two-dimensional code transmitted from the computer 40 at S344 (S345).

Next, the following describes operations of the output system 10 from reading of the two-dimensional code by the user terminal 20 up to completion of the document print job by the MFP 30.

Figure 26:
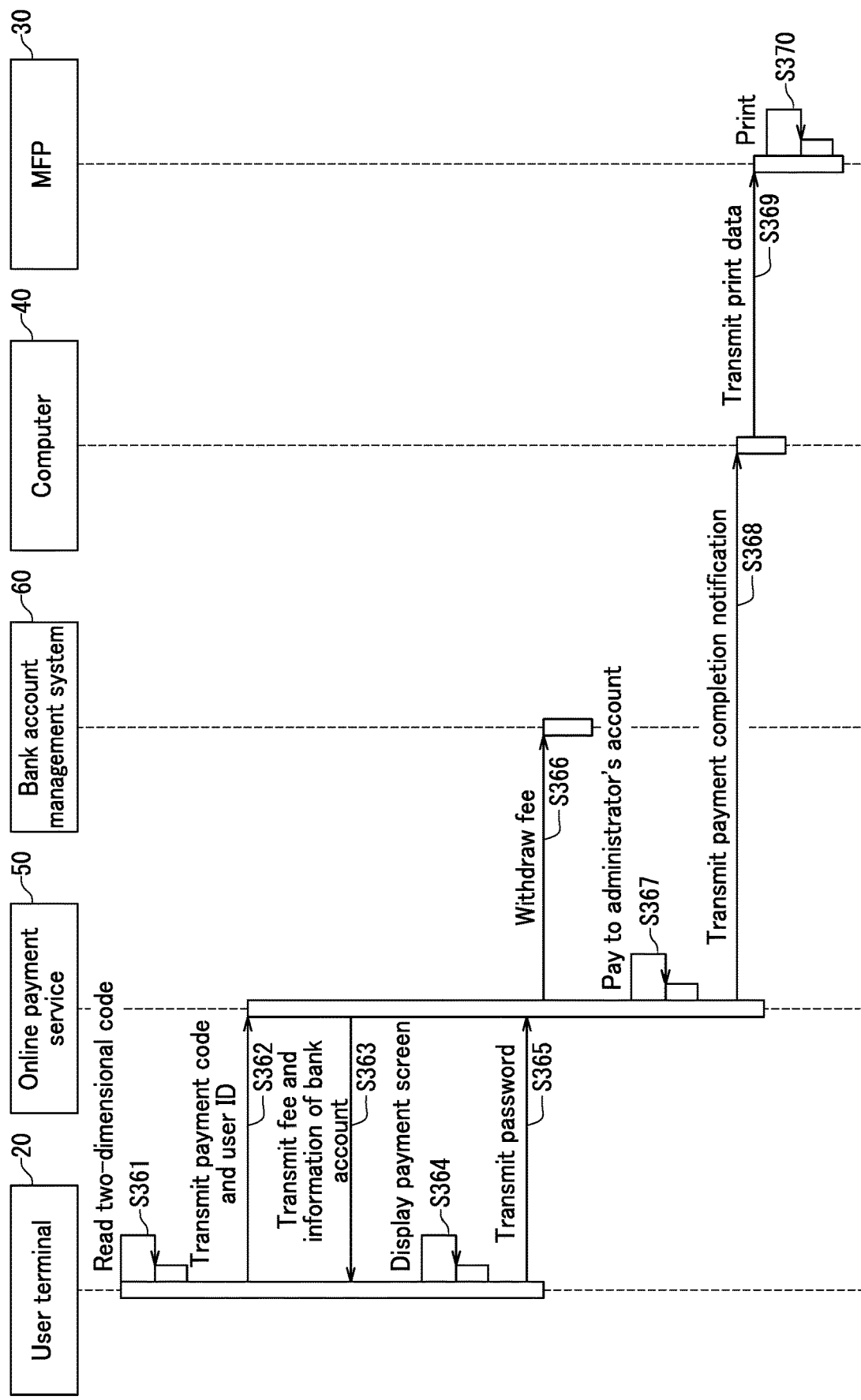
FIG. 26 is a sequence diagram of operations of the output system in the third embodiment from reading of the two-dimensional code by the user terminal to completion of the document print job by the MFP.

FIG. 26 is a sequence diagram of the operations of the output system 10 from reading of the two-dimensional code by the user terminal 20 up to completion of the document print job by the MFP 30.

As illustrated in FIG. 26, processes from S361 to S370 are the same as the processes from S231 to S240 (see FIG. 19) in the second embodiment, respectively. Therefore, description of the processes from S361 to S370 will be omitted.

As described above, the output system 10 includes the output section 90, the fee calculation section 43a, the payment code notification section 39b, and the display section 32. The output section 90 outputs an image and/or a document when a fee has been paid via the online payment service 50 using a payment code notified by the payment code notification section 39b. Therefore, the output system 10 executes printing on the basis of print data of a document (S370) after payment of an accurate fee based on the number of pages of the document and print settings (S365 to S367). As a result, convenience is improved since execution of the document print job of "printing a document stored in the document storage service 80" is not suspended by delay of payment of the fee.

In the output system 10, the print data generating section 43c of the computer 40 generates print data on the basis of print settings received by the print setting receiving section 39f of the MFP 30. Therefore, the document 80a stored in the document storage service 80 can be printed in accordance with print settings specified by the user through the MFP 30.

In the output system 10, the document storage service 80 storing therein the document 80a acquires the number of pages of the document 80a on the basis of the document 80a (S303). Therefore, the document storage service 80 is capable of acquiring the number of pages of the document 80a before print data to be printed by the printer 34 is generated by the computer 40 (S339). As a result, a period from indirect access to the document storage service 80 by the MFP 30 via the computer 40 (S331 to S334) to printing of the document 80a (S370) can be reduced.

Note that usually the user often stores the document 80a in the document storage service 80 through the user terminal 20 or an unillustrated computer such as a PC before coming to a position where the user can operate the operation section 31 of the MFP 30. Therefore, it is highly likely that the number of pages of the document 80a has already been acquired by the document storage service 80 when the user comes to the position where the user can operate the operation section 31 of the MFP 30. Therefore, it is highly likely that the document storage service 80 acquires the number of pages of the document 80a (S303) before print data to be printed by the printer 34 is generated by the computer 40 (S339).

In the third embodiment, the output system 10 calculates the fee using the number of pages transmitted from the document storage service 80 at S338 as the number of pages of the document 80a. However, the output system 10 may calculate the fee using the number of pages based on the print data generated at S339 as the number of pages of the document 80a.

In the third embodiment, the present disclosure is applied to the "document 80a stored in the document storage service 80." However, the present disclosure is also applicable to printing of a document other than the "document 80a stored in the document storage service 80."

Fourth Embodiment

The following describes the output system (scan transmission system) 10 according to a fourth embodiment of the present disclosure.

Figure 27:
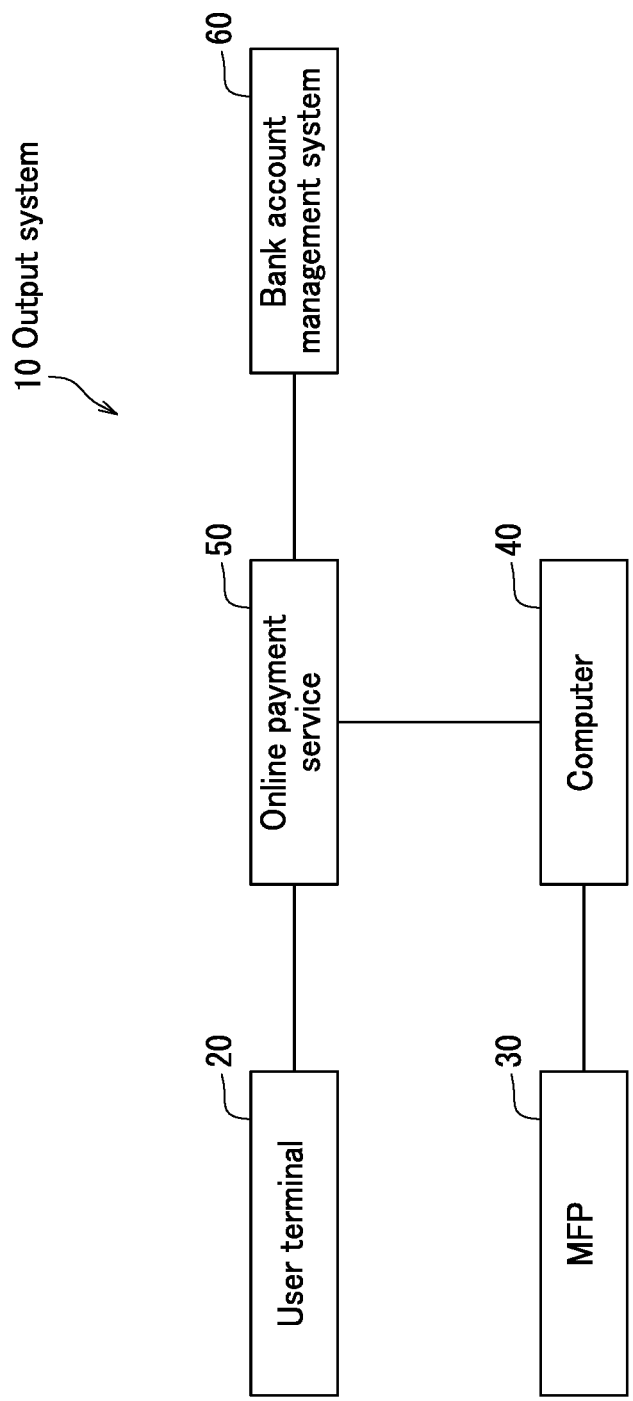
FIG. 27 is a block diagram of the output system according to the fourth embodiment.

FIG. 27 illustrates the output system 10 according to the fourth embodiment. The output system 10 according to the fourth embodiment differs from the output system 10 according to the first embodiment in that an image is transmitted (output) in response to payment of a fee by the user.

FIG. 27 is a block diagram of the output system 10 according to the fourth embodiment.

Figure 29:
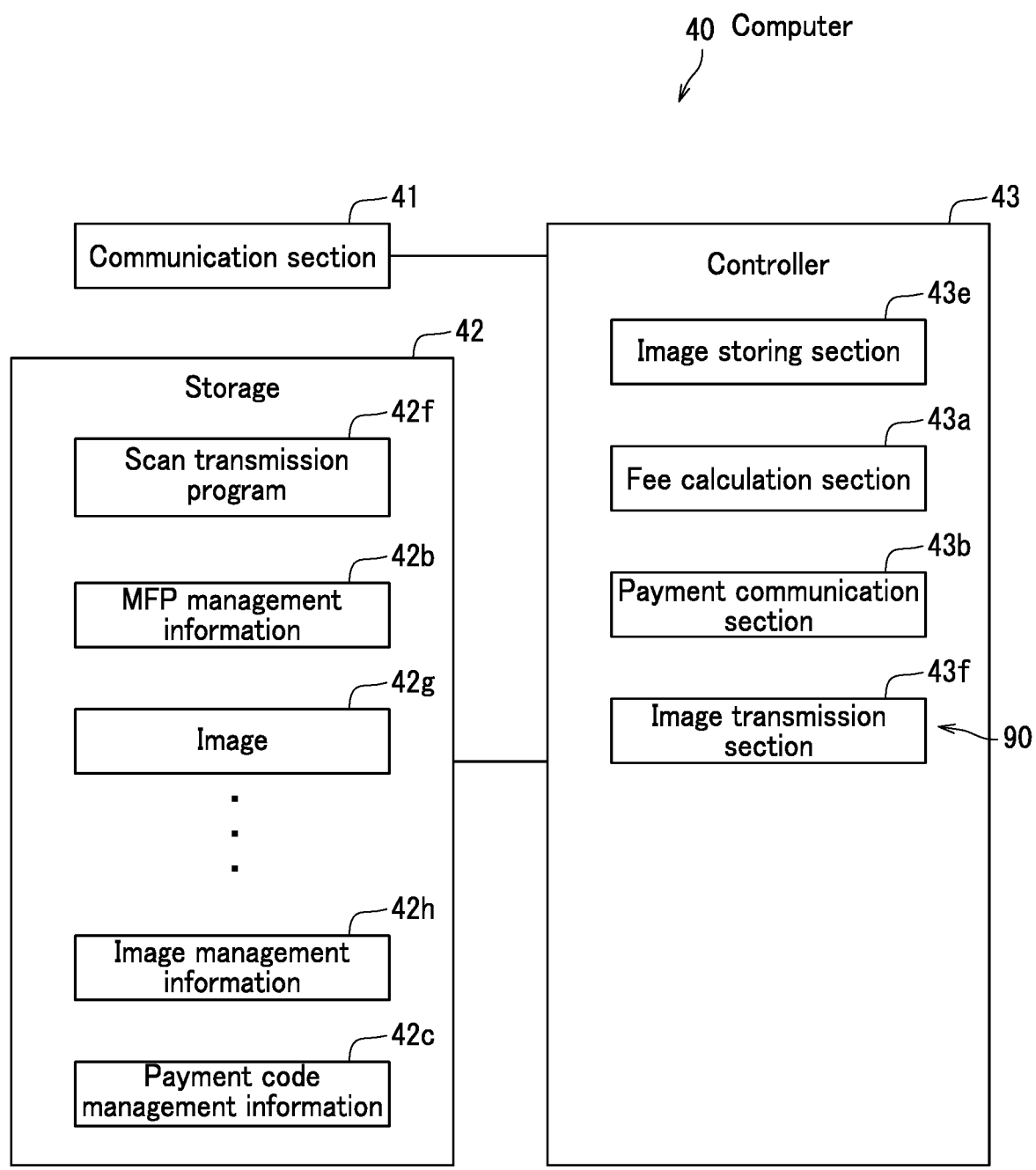
FIG. 29 is a block diagram of the computer according to the fourth embodiment.

As illustrated in FIG. 27, the output system 10 includes the user terminal 20, the MFP 30, the computer 40, the online payment service 50 (see FIGS. 8 and 9), the bank account management system 60, and the output section 90 (see FIG. 29).

Figure 28:
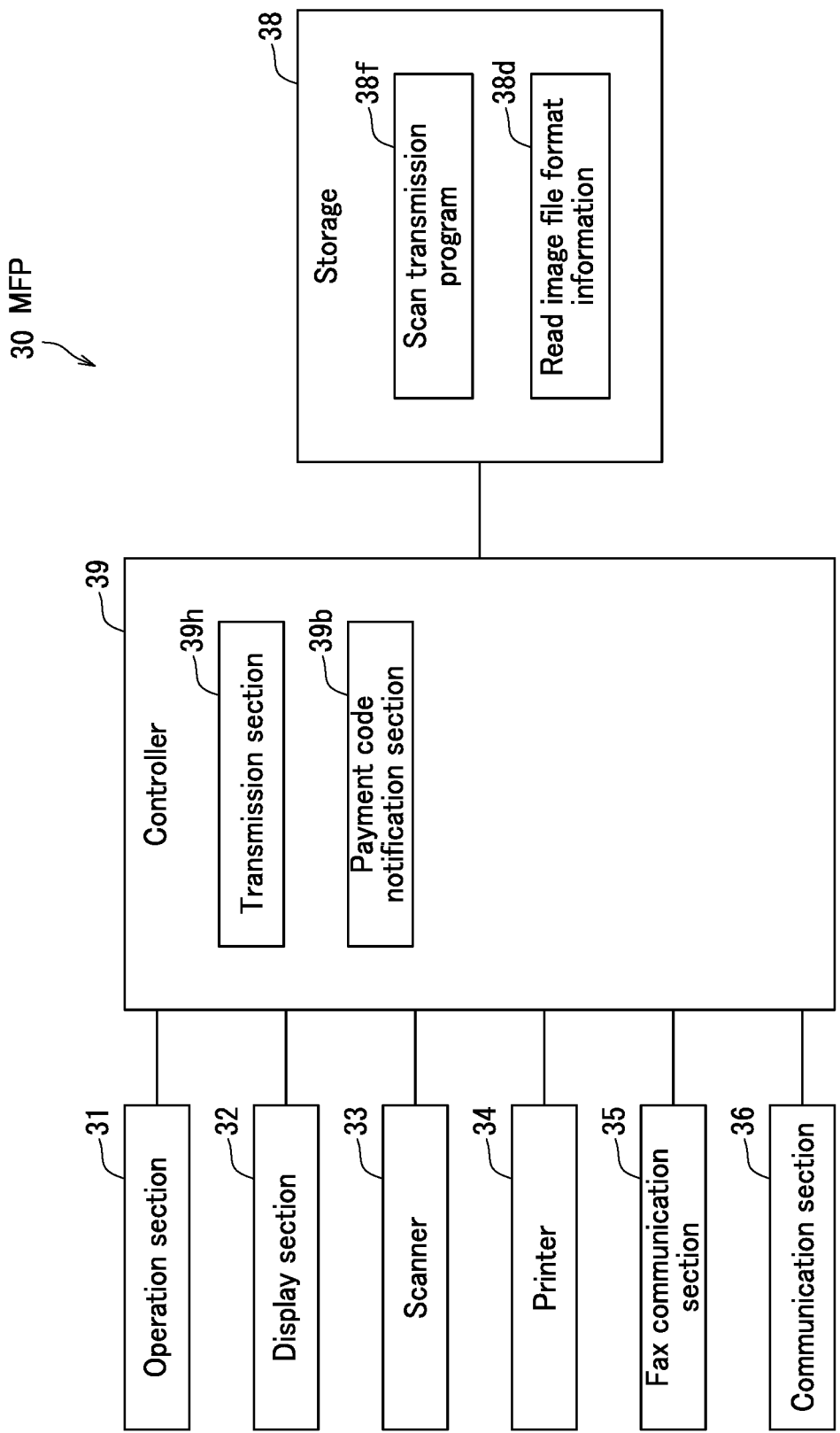
FIG. 28 is a block diagram of the MFP according to the fourth embodiment.

FIG. 28 is a block diagram of the MFP 30.

As illustrated in FIG. 28, the MFP 30 includes the operation section 31, the display section 32, the scanner 33, the printer 34, the fax communication section 35, the communication section 36, the storage 38, and the controller 39.

The storage 38 stores therein a scan transmission program 38f. The scan transmission program 38f executes a part of a scan transmission job of transmitting an image read from a document by the scanner 33. The scan transmission program 38f may be installed in the MFP 30 during manufacture of the MFP 30. Alternatively, the scan transmission program 38f may be additionally installed in the MFP 30 from an external storage medium such as a USB memory. Alternatively, the scan transmission program 38f may be additionally installed in the MFP 30 via a network.

The storage 38 is capable of storing therein the read image file format information 38d.

Through execution of computer programs (specifically, the scan transmission program 37a) stored in the ROM device of the controller 39 or in the storage 38, the processor of the controller 39 functions as a transmission section 39h and the payment code notification section 39b. Through execution of the scan transmission program 38f, the transmission section 39h transmits an image read from a document by the scanner 33 to the computer 40 (see FIG. 1).

FIG. 29 is a block diagram of the computer 40.

As illustrated in FIG. 29, the computer 40 includes the communication section 41, the storage 42, and the controller 43.

The storage 42 stores therein a scan transmission program 42f for executing a part of the scan transmission job. The scan transmission program 42f may be installed in the computer 40 during manufacture of the computer 40. The scan transmission program 42f may be additionally installed in the computer 40 from an external storage medium such as a USB memory, a compact disk (CD), or a digital versatile disk (DVD). The scan transmission program 42f may be additionally installed in the computer 40 via a network.

The storage 42 stores therein the MFP management information 42b (see FIG. 6) for managing MFPs.

The storage 42 is capable of storing therein a plurality of images 42g read from documents by the scanner 33 (see FIG. 28).

The storage 42 is capable of storing therein image management information 42h for managing the images 42g.

FIG. 30 is a diagram illustrating an example of the image management information 42h.

As illustrated in FIG. 30, the image management information 42h is information in which an image ID that is identification information of an image is associated with a job ID that is identification information of a job and transmission conditions of the image.

The transmission conditions of the image include a transmission method such as server message block (SMB), file transfer protocol (FTP), E-mail, or Cloud Storage and information of a specific destination.

As illustrated in FIG. 29, the storage 42 is capable of storing therein the payment code management information 42c (see FIG. 7) for managing payment codes issued by the online payment service 50 (see FIG. 27).

Through execution of computer programs (specifically, the scan transmission program 42f) stored in the ROM device of the controller 43 or in the storage 42, the processor of the controller 43 functions as an image storing section 43e, the fee calculation section 43a, the payment communication section 43b, and an image transmission section 43f. The image storing section 43e stores in the storage 42 an image read from a document by the scanner 33 (see FIG. 28). The fee calculation section 43a calculates a fee on the basis of a result of reading of the document by the scanner 33. The image transmission section 43f transmits the image 42g stored in the storage 42 when the fee is paid via the online payment service 50 using a payment code notified by the MFP 30 (see FIG. 28). The image transmission section 43f transmits the image 42g for example to a terminal designated by a user of the online payment service. Note that the image transmission section 43f may transmit the image 42g and/or a document to the terminal designated by the user of the online payment service. The output system 90 in the fourth embodiment includes the image transmission section 43f.

Next, the following describes operations of the output system 10.

First, the following describes operations of the output system 10 up to display of a two-dimensional code by the MFP 30 to which an instruction to execute the scan transmission job is input.

Figure 31:
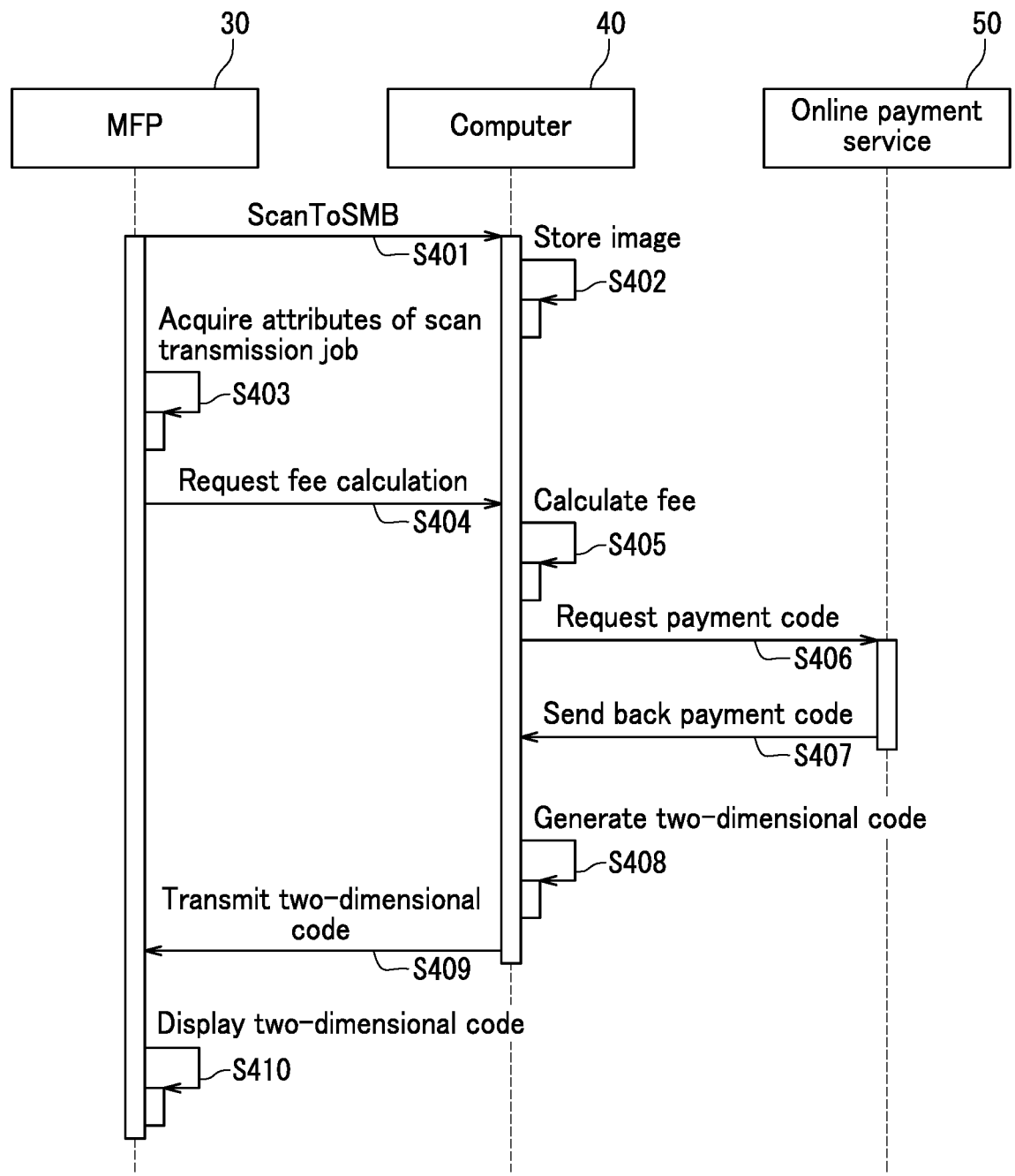
FIG. 31 is a sequence diagram of operations of the output system in the fourth embodiment up to display of a two-dimensional code by the MFP to which an instruction to execute a scan transmission job is input.

FIG. 31 is a sequence diagram of the operations of the output system 10 up to display of the two-dimensional code by the MFP 30 to which the instruction to execute the scan transmission job is input. The scan transmission job is a job of transmitting an image read from a document by the scanner 33.

The user can input the instruction to execute the scan transmission job through the operation section 31. When the instruction to execute the scan transmission job is input through the operation section 31, the transmission section 39h of the MFP 30 executes an "operation (hereinafter referred to as "ScanToSMB" of transmitting an image read from a document by the scanner 33 to a particular SMB folder in the computer 40" (S401) as illustrated in FIG. 31. Here, at S401, the transmission section 39h transmits to the computer 40 a job ID of the current scan transmission job and transmission conditions for the current scan transmission job specified through the operation section 31.

Figure 32:
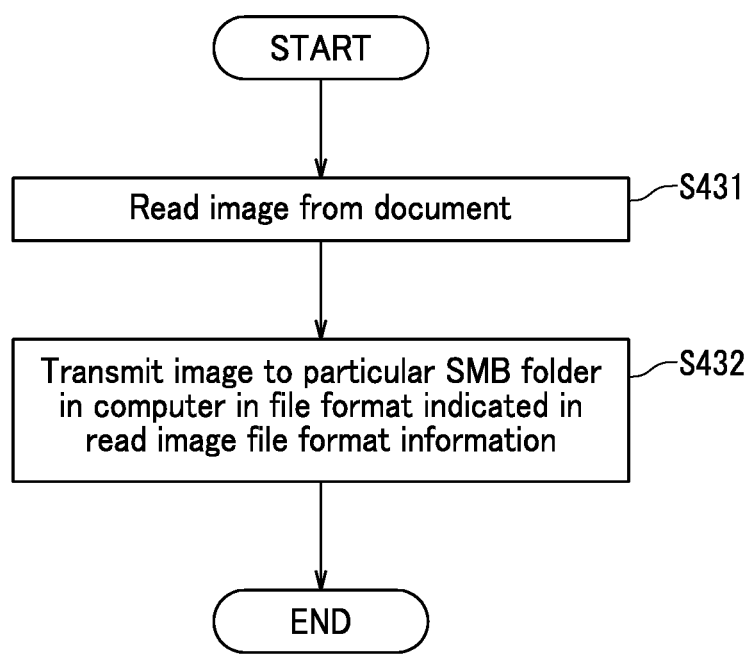
FIG. 32 is a flowchart of operations of the MFP when executing ScanToSMB in the fourth embodiment.

FIG. 32 is a flowchart of operations of the MFP 30 when executing ScanToSMB.

As illustrated in FIG. 32, the transmission section 39h reads an image from a document through the scanner 33 (S431).

Next, the transmission section 39h transmits the image read at S401 to a particular SMB folder in the computer 40 in a file format indicated in the read image file format information 38d (S432) and ends the operations illustrated in FIG. 11.

As illustrated in FIG. 31, the image storing section 43e of the computer 40 stores in the particular SMB folder of the storage 42 the image transmitted from the MFP 30 at S401 as the image 42g (S402). Here, the image storing section 43e stores in the image management information 42h an image ID of the image stored at S402 in association with the job ID of the current job and the transmission conditions that have been transmitted from the MFP 30 at S401.

After the process at S401, the payment code notification section 39b of the MFP 30 acquires attributes of the current scan transmission job (S403).

Here, the attributes of the scan transmission job include for example page number information, color information, recording medium size information, collection information, and magnification information. The page number information indicates the number of pages of the image in an image file. The image file is a file of the image stored in the particular SMB folder in the computer 40 at S401. The color information indicates whether data of the image in the image file are monochrome data or color data. The recording medium size information indicates a size of a recording medium in the image file. The collection information indicates the number of pages of the document collected in a page in the image file.

The payment code notification section 39b determines the page number information on the basis of a result of reading of the document by the scanner 33.

The payment code notification section 39b determines the color information in accordance with a setting in the instruction to execute the scan transmission job input through the operation section 31. However, the payment code notification section 39b may determine the color information on the basis of the result of reading of the document by the scanner 33.

The payment code notification section 39b determines the recording medium size information in accordance with a setting in the instruction to execute the scan transmission job. However, the payment code notification section 39b may determine the recording medium size information on the basis of the result of reading of the document by the scanner 33.

The payment code notification section 39b determines the collection information and the magnification information in accordance with settings in the instruction to execute the scan transmission job input through the operation section 31.

Processes from S404 to S410 are the same as the processes from S103 to S109 (see FIG. 10) in the first embodiment, respectively. Therefore, description of the processes from S404 to S410 will be omitted.

Next, the following describes operations of the output system 10 from reading of the two-dimensional code by the user terminal 20 up to completion of the scan transmission job by the MFP 30.

Figure 33:
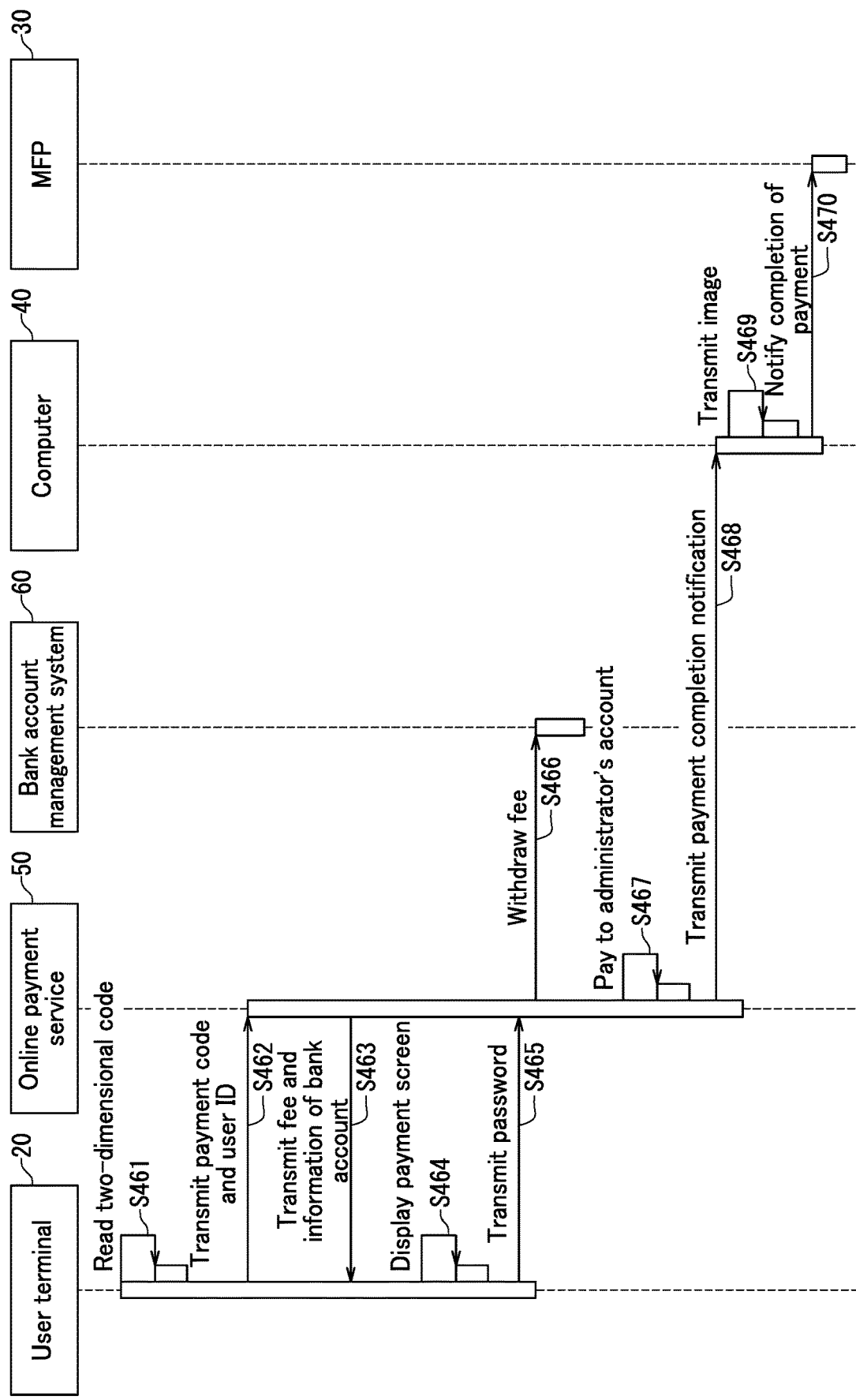
FIG. 33 is a sequence diagram of operations of the output system in the fourth embodiment from reading of the two-dimensional code by the user terminal to completion of the scan transmission job by the MFP.

FIG. 33 is a sequence diagram of the operations of the output system 10 from reading of the two-dimensional code by the user terminal 20 up to completion of the scan transmission job by the MFP 30.

As illustrated in FIG. 33, processes from S461 to S468 are the same as the processes from S161 to S168 (see FIG. 12) in the first embodiment, respectively. Therefore, description of the processes from S461 to S468 will be omitted.

When the payment completion notification has been transmitted from the online payment service 50 at S468, the image transmission section 43f of the computer 40 transmits the image 42g having the image ID that is associated with a specific job ID in the image management information 42h (S469). The image 42g is transmitted in accordance with the transmission conditions that are associated with the specific job ID in the image management information 42h. The specific job ID is the job ID that is associated with the payment code transmitted together with the payment completion notification from the online payment service 50 at S468 in the payment code management information 42c. Therefore, when the online payment service 50 pays the fee to the specific second account, the image transmission section 43f, which is the output section 90, transmits (outputs) the image 42g. Note that the image transmission section 43f may transmit (output) the image 42g and/or the document.

After the processing at S469, the payment communication section 43b of the computer 40 notifies completion of the payment of the fee and completion of the scan transmission job to the MFP 30 having the MFP ID that is associated with a specific payment code in the payment code management information 42c (S470). The specific payment code is the payment code transmitted together with the payment completion notification from the online payment service 50 at S468. Therefore, the MFP 30 can display for example in the display section 32 notice of the completion of the payment of the fee and the completion of the scan transmission job.

As described above, the output system 10 includes the output section 90, the fee calculation section 43a, the payment code notification section 39b, and the display section 32. The output section 90 outputs an image and/or a document when a fee has been paid via the online payment service 50 using a payment code notified by the payment code notification section 39b. Therefore, the output system 10 stores in the storage 42 an image generated by reading of a document by the scanner 33 (S402), and transmits the image (S469) after payment of an accurate fee based on a result of the reading (S465 to S467). As a result, convenience is improved since execution of the scan transmission job of "reading an image from a document by the scanner 33 and transmitting the image" is not suspended by delay of payment of the fee.

The following describes effects common to the output systems 10 according to the first through fourth embodiments.

The output systems 10 according to the first through fourth embodiments each include the output section 90, the fee calculation section 43a, the payment code notification section 39b, and the display section 32. The output section 90 outputs an image and/or a document when a fee has been paid via the online payment service 50 using a payment code notified by the payment code notification section 39b. That is, the output systems 10 according to the first through fourth embodiments each use the online payment service 50 rather than a coin vending machine for payment of the fee. Therefore, collection of the fee from the coin vending machine is unnecessary since the fee is directly paid from a bank account of the user of the MFP 30 to an account of the administrator of the MFP 30. As a result, labor costs can be reduced and the fee can be received more safely.

The output systems 10 according to the first through fourth embodiments each use the online payment service 50 rather than the coin vending machine for payment of the fee. Therefore, the output systems 10 can be easily introduced even in countries where coin vending machines are not widely used.

In each of the output systems 10 according to the first through fourth embodiments, the MFP 30 notifies the payment code by displaying the payment code in the display section 32 (S109, S209, S345, S410). That is, the output systems 10 according to the first through fourth embodiments each include the output section 90, the fee calculation section 43a, the payment code notification section 39b, and the display section 32. The payment code notification section 39b notifies the payment code by displaying the payment code in the display section 32. Therefore, even in a situation in which the user terminal 20 and the MFP 30 are not capable of communicating with each other, the fee can be paid through the user terminal 20 via the online payment service 50 using the payment code displayed in the display section 32 of the MFP 30.

In each of the output systems 10 according to the first through fourth embodiments, the payment code is compactly displayed as a two-dimensional code in the display section 32 of the MFP 30. Therefore, convenience is improved since the payment code can be easily imaged through the imaging section 23 of the user terminal 20. Note that the payment code may be displayed as a character string or a one-dimensional code in the display section 32 in the output system 10.

In each of the output systems 10 according to the first through fourth embodiments, the user terminal 20 acquires the payment code displayed in the display section 32 by imaging the payment code through the imaging section 23. Therefore, the user of the user terminal 20 need not manually input to the user terminal 20 the payment code displayed in the display section 32 of the MFP 30. As a result, convenience is improved by the output system 10. Note that in a configuration in which the payment code is displayed in the display section 32 in a form that the user of the user terminal 20 can understand, such as a character string, rather than the two-dimensional code, the payment code may be manually input to the user terminal 20 by the user of the user terminal 20.

In each of the output systems 10 according to the first through fourth embodiments, an account managed by the online payment service 50 is used as the account (specific second account) of the administrator of the MFP 30. However, rather than an account managed by the online payment service 50, a bank account may be used as the account of the administrator of the MFP 30.

In each of the output systems 10 according to the first through fourth embodiments, a bank account is used as the account (specific first account) of the user of the MFP 30. However, rather than a bank account, an account managed by the online payment service 50 may be used as the account of the user of the MFP 30.

In the output system 10 according to the first embodiment, the MFP 30 may implement at least a part of the above-described functions of the computer 40 through execution of the scan-external-storage program 38a. In each of the output systems 10 according to the second and third embodiments, the MFP 30 may implement at least a part of the above-described functions of the computer 40 through execution of the document print program 38e. In the output system 10 according to the fourth embodiment, the MFP 30 may implement at least a part of the above-described functions of the computer 40 through execution of the scan transmission program 38f. For example, each of the output systems 10 according to the first through fourth embodiments may be configured such that the MFP 30 implements functions of the fee calculation section 43a of the computer 40. In a configuration in which the MFP 30 implements all of the above-described functions of the computer 40, each of the output systems 10 according to the first through fourth embodiments need not necessarily include the computer 40. That is, the MFP 30 may include a part or all of elements of configuration of the computer 40. In the above configuration, the MFP 30 includes the output section 90, the fee calculation section 43a, and the payment code notification section 39b. The output section 90 outputs an image and/or a document when a fee has been paid via the online payment service 50 using a payment code notified by the payment code notification section 39b. As a result, improvement of convenience, reduction of labor costs, and more safely reception of the fee can be achieved.

Although the present disclosure has been described about the embodiments in which the image forming apparatus is the MFP, the image forming apparatus may be a dedicated scanner or the like, rather than the MFP.

Note that the image forming apparatus of the present disclosure can be embodied within a scope as defined by each claim by employing any combination of the above-described embodiments and variations thereof, modifying the embodiments and the variations as appropriate, or omitting a part of the embodiments and the variations.

What is claimed is:

1. An output system comprising:
an image forming apparatus including a reading device; and
a computer, wherein
the image forming apparatus includes:
   storage;
   an image storing section that stores in the storage an image read from a document by the reading device;
   an external storage section that stores the image stored in the storage in an external storage medium; and
   a payment code notification section that notifies a payment code issued by an external online payment service,
the computer includes:
   a fee calculation section that calculates a fee necessary for executing a specific job; and
   a payment communication section that performs communication for payment via the external online payment service,
when the image forming apparatus executes a storage job to store an image read by the reading device in the external storage medium:
   the image storing section stores in the storage the image read by the reading section in association with image management information containing an image ID and a job ID, the image ID being identification information of the image, the job ID being identification information of the storage job;
   the payment code notification section transmits to the computer the image, the image management information, an image forming apparatus ID, and a request to calculate a fee for the storage job, the image forming apparatus ID being identification information of the image forming apparatus;
   the fee calculation section performs calculation of a fee necessary for executing the storage job on the basis of a specific standard; and
   the payment communication section requests the online payment service to issue a payment code on the basis of a result of the calculation,
when the payment code is returned to the computer from the online payment service:
   the computer stores therein as payment code management information the payment code in association with the image management information and the image forming apparatus ID;
   the computer transmits the payment code on the basis of the payment code management information to the image forming apparatus having the image forming apparatus ID; and
   the image forming apparatus notifies a user of the payment code, and
when the fee is paid via the online payment service using the payment code and the computer receives the payment code and a payment completion notification for the storage job:
   the computer transmits the payment completion notification and the payment code management information to the image forming apparatus having the image forming apparatus ID on the basis of the payment code management information; and
   the external storage section stores the image in association with the job ID in the external storage medium on the basis of the payment code management information.

2. The output system according to claim 1, further comprising
a display device, wherein
the payment code notification section notifies the payment code by displaying the payment code in the display device.

3. The output system according to claim 2, further comprising
a user terminal for paying the fee via the online payment service using the payment code notified by the payment code notification section, wherein
the user terminal includes an imaging device and acquires the payment code by imaging the payment code displayed in the display device through the imaging device.

4. The output system according to claim 3, wherein
the payment code notification section displays the payment code as a two-dimensional code in the display device.

5. The output system according to claim 1, further comprising:
a user terminal for paying the fee via the online payment service using the payment code notified by the payment code notification section; and
the online payment service that executes online payment, wherein
the user terminal includes a display section that displays a payment screen,
the payment screen includes a textbox to which a password of a specific first account is to be entered, and
when the password is correctly entered in the textbox, the online payment service withdraws the fee from the specific first account and pays the fee withdrawn from the specific first account to a specific second account.

6. The output system according to claim 5, wherein
the external storage section stores the image in the external storage medium when the fee has been paid by the online payment service to the specific second account.

7. An output system comprising:
an image forming apparatus including a printing device and a document printing section; and
a computer, wherein
the image forming apparatus includes:
  storage;
  a document transmission section that transmits a document to the computer; and
  a payment code notification section that notifies a payment code issued by an external online payment service,
the computer includes:
  a fee calculation section that calculates a fee necessary for executing a specific job;
  a print data generating section that generates print data of the document; and
  a payment communication section that that performs communication for payment via the external online payment service,
when the image forming apparatus executes a document printing job:
  the storage stores therein the document in association with a job ID, the job ID being identification information of the document printing job;
  the document transmission section transmits to the computer the document and the job ID in association with an image forming apparatus ID, the image forming apparatus ID being identification information of the image forming apparatus,
  the print data generating section generates print data of the document and transmits the generated print data to the fee calculation section;
  the fee calculation section performs calculation of a fee necessary for executing the document printing job on the basis of a specific standard; and
  the payment communication section requests the online payment service to issue a payment code on the basis of a result of the calculation,
when the payment code is returned to the computer from the online payment service:
  the computer stores therein as payment code management information the payment code in association with a print data ID, the job ID, and the image forming apparatus ID, the print data ID being identification information of the print data;
  the computer transmits the payment code to the image forming apparatus having the image forming apparatus ID on the basis of the payment code management information; and
  the image forming apparatus notifies a user of the payment code, and
when the fee is paid via the online payment service using the payment code and the computer receives the payment code and a payment completion notification for the document printing job:
  the computer transmits the payment completion notification, the payment code management information, and the print data to the image forming apparatus having the image forming apparatus ID on the basis of the payment code management information; and
  the document printing section executes image printing of the document associated with the job ID on the basis of the print data using the printing device.

8. The output system according to claim 1, wherein
the fee calculation section calculates the fee on the basis of the number of pages of the document and a print setting.

9. The output system according to claim 8, wherein
the image forming apparatus further includes a print setting receiving section that receives the print setting, and
the print data generating section generates the print data in accordance with the print setting received by the print setting receiving section.

10. The output system according to claim 8, wherein
the print data generating section generates the print data of the document stored in a document storage service storing the document therein.

11. The output system according to claim 10, further comprising
the document storage service, wherein
the document storage service acquires the number of pages on the basis of the document, and
the fee calculation section calculates the fee on the basis of the number of pages acquired by the document storage service.

12. The output system according to claim 7, wherein
the image forming apparatus further includes a print setting receiving section that receives a print setting for the document, and
the print data generating section generates the print data in accordance with the print setting received by the print setting receiving section.

13. The output system according to claim 7, wherein
the image forming apparatus further includes a connection section to which an external storage medium is connectable, and
the print data generating section generates the print data of the document stored in the external storage medium.

14. The output system according to claim 7, wherein
the computer further includes a document list acquisition section that acquires a document list in association with document IDs from external storage, the document list listing information of a plurality of documents stored in the storage, the document IDs each being an ID inherent to a corresponding one of the documents,
the image forming apparatus further includes a document selection section that selects at least a document necessary for printing among the documents listed in the document list,
when the image forming apparatus executes a print job to successively print documents selected by the document selection section among the documents:
  the document selection section stores document IDs of the respective selected documents in the storage in a form of a document list;
  the document selection section transmits the document list in association with the image forming apparatus ID to the print data generating section;
  the printing data generating section acquires data of documents corresponding to the respective document IDs from the external storage, generates print data of the documents corresponding to the respective document IDs, and transmits the print data to the fee calculation section;
  the fee calculation section performs calculation of a fee necessary for executing the job based on a specific standard or a total number of pages to be printed; and
  the payment communication section requests the online payment service to issue a payment code based on a result of the calculation.

15. An outputs system comprising:
an image forming apparatus including a reading device; and
a computer, wherein
the image forming apparatus includes:
  storage;
  an image storing section that stores in the storage an image read from a document by the reading device;
  a scan transmission section that transmits the image to the computer; and
  a payment code notification section that notifies a payment code issued by an external online payment service,
the computer includes:
  a fee calculation section that performs calculation of a fee necessary for executing a specific job;
  a scan image storing section that stores therein the image transmitted from the scan transmission section;
  a payment communication section that performs communication for payment via the external online payment service, and
  an image transmission section that performs external transmission of the image,
when the image forming apparatus executes a transmission job to transmit an image read by the reading device from the image transmission section of the computer to outside:
  the storage stores therein the read image in association with image management information including an image ID and a job ID, the image ID being identification information of the image, the job ID being identification image of the transmission job;
  the scan transmission section transmits to the computer the image, the image management information, an image forming apparatus ID, and a request to calculate a fee for the transmission job, the image forming apparatus ID being identification information of the image forming apparatus;
  the scan image storing section stores therein the image in association with the job ID and the image forming apparatus ID;
  the fee calculation section calculates a fee necessary for the transmission job on the basis of a specific standard; and
  the payment communication section requests the online payment service to issue a payment code on the basis of a result of the calculation,
when the payment code is returned to the computer from the online payment service:
  the computer stores therein the payment code in association with the job ID and the image forming apparatus ID as payment code management information;
  the computer transmits the payment code to the image forming apparatus having the image forming apparatus ID on the basis of the payment code management information; and
  the image forming apparatus notifies a user of the payment code,
when the fee is paid via the online payment service using the payment code and the computer receives the payment code and a payment completion notification for the transmission job,
  the image transmission section transmits the image in association with the job ID on the basis of the payment code management information.

* * * * *